(12) United States Patent
Nishimura et al.

(10) Patent No.: US 8,485,902 B2
(45) Date of Patent: Jul. 16, 2013

(54) STORAGE MEDIUM STORING OBJECT CONTROLLING PROGRAM, OBJECT CONTROLLING APPARATUS AND OBJECT CONTROLLING METHOD

(75) Inventors: Kentaro Nishimura, Kyoto (JP); Sumiaki Ono, Tokyo (JP); Taketo Haga, Tokyo (JP)

(73) Assignee: Nintendo Co., Ltd., Kyoto (JP)

( * ) Notice: Subject to any disclaimer, the term of this patent is extended or adjusted under 35 U.S.C. 154(b) by 368 days.

(21) Appl. No.: 12/773,311

(22) Filed: May 4, 2010

(65) Prior Publication Data

US 2011/0214093 A1 Sep. 1, 2011

(30) Foreign Application Priority Data

Feb. 26, 2010 (JP) ................................. 2010-041530

(51) Int. Cl.
*A63F 13/00* (2006.01)

(52) U.S. Cl.
USPC ............................... 463/37; 463/30; 345/173

(58) Field of Classification Search
USPC ...................................... 463/25–42; 715/757
See application file for complete search history.

(56) References Cited

U.S. PATENT DOCUMENTS

| | | | |
|---|---|---|---|
| 5,511,983 A | 4/1996 | Kashii et al. | |
| 5,617,117 A | 4/1997 | Kataoka et al. | |
| 5,900,877 A | 5/1999 | Weiss et al. | |
| 6,590,568 B1 | 7/2003 | Astala et al. | |
| 6,664,965 B1 | 12/2003 | Yamamoto et al. | |
| 6,874,126 B1 | 3/2005 | Lapidous | |
| 7,248,270 B1 | 7/2007 | Boylan | |
| 7,607,983 B2 * | 10/2009 | Nakajima et al. | 463/40 |
| 7,803,049 B2 * | 9/2010 | Nakada et al. | 463/36 |
| 8,062,131 B2 * | 11/2011 | Hoga et al. | 463/37 |
| 8,207,970 B2 | 6/2012 | Matsuoka | |
| 2003/0034439 A1 | 2/2003 | Reime et al. | |
| 2003/0034961 A1 | 2/2003 | Kao | |
| 2003/0197744 A1 | 10/2003 | Irvine | |
| 2003/0214491 A1 | 11/2003 | Keely et al. | |
| 2004/0021663 A1 | 2/2004 | Suzuki et al. | |
| 2004/0164956 A1 | 8/2004 | Yamaguchi et al. | |
| 2004/0196267 A1 | 10/2004 | Kawai et al. | |

(Continued)

FOREIGN PATENT DOCUMENTS

| | | |
|---|---|---|
| JP | 4-333912 | 11/1992 |
| JP | 5-031256 | 2/1993 |

(Continued)

OTHER PUBLICATIONS

Sakaguchi et al. "Visual Basic 6.0 Application Development and Programming: The Definite Edition" pp. 48-53, Kyoritsu Shuppan Co., Ltd., Jun. 20, 2000.

(Continued)

*Primary Examiner* — Masud Ahmed
(74) *Attorney, Agent, or Firm* — Nixon & Vanderhye PC

(57) ABSTRACT

A game apparatus includes a first LCD and a second LCD, and on the second LCD, a touch panel is provided. On the first LCD, an enemy object is displayed. On the second LCD, a drawn object generated according to a touch operation is displayed. When the drawn object is generated, the drawn object is moved according to a moving course based on a locus of the touch operation. When the drawn object hits the enemy object, the enemy object is damaged.

12 Claims, 14 Drawing Sheets

U.S. PATENT DOCUMENTS

| | | |
|---|---|---|
| 2005/0130738 A1 | 6/2005 | Miyamoto et al. |
| 2005/0168449 A1 | 8/2005 | Katayose |
| 2007/0024597 A1 | 2/2007 | Matsuoka |
| 2007/0063986 A1* | 3/2007 | Hoga et al. .................. 345/173 |
| 2008/0225007 A1 | 9/2008 | Nakadaira et al. |

FOREIGN PATENT DOCUMENTS

| | | |
|---|---|---|
| JP | 5-100809 | 9/1998 |
| JP | 2001-297258 | 10/2001 |
| JP | 2002-328040 | 11/2002 |
| JP | 2004-070492 | 3/2004 |
| JP | 2005-032015 | 2/2005 |
| JP | 2005-092472 | 4/2005 |
| JP | 2005-193006 | 7/2005 |
| JP | 2007-034634 | 2/2007 |

OTHER PUBLICATIONS

Office Action for U.S. Appl. No. 11/493,037, mailed Mar. 5, 2009.
Office Action for U.S. Appl. No. 11/493,037, mailed Sep. 10, 2009.
Office Action for U.S. Appl. No. 11/493,037, mailed Mar. 5, 2010.
Office Action for U.S. Appl. No. 11/493,037, mailed Oct. 13, 2010.
Office Action for U.S. Appl. No. 11/493,037, mailed Apr. 6, 2011.
Notice of Allowance for U.S. Appl. No. 11/493,037, mailed Dec. 30, 2011.

* cited by examiner (A) TOP VIEW (FOLDED STATE)

(B) LEFT SIDE VIEW (FOLDED STATE)

(A) DRAWN OBJECT (B) DIRECTION VECTOR

FIG. 8

(A) THICKNESS-OF-LINE TABLE

| THICKNESS | THE NUMBER OF DOTS | DAMAGE (OFFENSIVE POWER) |
|---|---|---|
| FINE | 1 | 10 |
| NORMAL | 3 | 20 |
| BOLD | 5 | 30 |

(B) INFORMATION OF OBJECT

| NUMBER OF SAMPLE | COORDINATES | THICKNESS |
|---|---|---|
| 1 | x1, y1 | — |
| 2 | x2, y2 | FINE |
| 3 | x3, y3 | BOLD |
| 4 | x4, y4 | BOLD |
| ⋮ | ⋮ | ⋮ |
| m | xm, ym | NORMAL |

STORAGE MEDIUM STORING OBJECT CONTROLLING PROGRAM, OBJECT CONTROLLING APPARATUS AND OBJECT CONTROLLING METHOD

CROSS REFERENCE OF RELATED APPLICATION

The disclosure of Japanese Patent Application No. 2010-41530 is incorporated herein by reference.

FIELD

The technology herein relates to a storage medium storing an object controlling program, an object controlling apparatus and an object controlling method. More specifically, certain example embodiments relate to a storage medium storing an object controlling program, an object controlling apparatus and an object controlling method which cause an object to generate and move according to an operation by a player.

BACKGROUND AND SUMMARY

One example of the related art is disclosed in Japanese Patent Application Laid-Open No. 2007-34634 [G06F 3/14, A63F 13/00, G06T 13/00] (Document 1) laid-open on Feb. 8, 2007. In an object controlling apparatus of the document 1, when a player makes a touch-on operation, a bullet object is generated at a touched position, and when a stick is slid in a downward direction of the screen with the screen touched, a tail fluke of the bullet object is generated. Thereafter, when the player makes a touch-off operation, the bullet object is moved in an upward direction of the screen. When the bullet object collides with an enemy character, if an offensive power of the bullet object exceeds stamina of the enemy character, the enemy object disappears.

However, in the object controlling apparatus disclosed in the document 1, the bullet object can be made to appear in an arbitrary touched position, but the shape of the bullet object is fixedly decided in the form of a vertically-long rod. Furthermore, the bullet object merely moves from the downward direction to the upward direction of the screen, basically. That is, the bullet object merely moves linearly. Thus, it is easily expect the movement of the bullet object, making the game simple. As a result, the player is tired of the game soon.

Therefore, certain example embodiments provide a novel storage medium storing an object controlling program, a novel object controlling apparatus and a novel object controlling method.

Furthermore, certain example embodiments provide a storage medium storing an object controlling program, an object controlling apparatus and an object controlling method which are able to increase interest in a game.

In certain example embodiments a storage medium storing an object controlling program is provided, and the object controlling program causes a computer to function as an input detector, an object generator, and an object mover. The input detector detects an operation input by a player. The object generator generates a first object according to the operation inputs detected by the input detector. The object mover moves the first object generated by the object generator according to a moving course based on the operation inputs detected by the input detector.

According to some embodiments, the object is generated according to the operation inputs by the player, and the object moves according to the moving course based on the operation inputs, and therefore, it becomes possible to generate an object in a complex shape with a simple operation, and moreover move the object according to a complex moving course. That is, it is necessary to generate the object with the strategy devised, thus capable of increasing interest in the game.

A second aspect is according to the first aspect, and a moving direction decider decides a moving direction when the first object moves based on a locus indicated by the operation inputs detected by the input detector in a case that the first object is generated by the object generator. The object mover moves the first object according to a moving course determined by utilizing the moving direction decided by the moving direction decider.

According to certain example embodiments, the first object is generated according to the locus of the operation inputs by the player, and the moving course is determined by utilizing the moving direction decided based on the locus, so that the first object has to be drawn in view of the moving course. Thus, the movement of the object as well as drawing of the object is taken into consideration, and the game is hard to become simple, capable of increasing interest.

A third aspect is according to the first aspect, and the operation input by the player is coordinate data indicating coordinates on a display surface of a displayer. The object generator generates the first object by connecting the coordinates indicated by a plurality of coordinate data in chronological order with a line segment. That is, the object in line drawing is generated by the player.

According to certain example embodiments, by merely drawing a line, an object can be generated, so that it is possible to generate an object even in the form of a complex shape with a simple operation.

A fourth aspect is according to the third aspect, and the object generator changes the thickness of each of the line segments depending on a distance between temporally continuous coordinates. For example, in a case that the distance between temporally continuous coordinates is short, the thickness of the line segment is increased, whereas in a case that the distance between the temporally continuous coordinates is long, the thickness of the line segment is reduced. Here, the thickness may be set conversely.

According to certain example embodiments, the thickness of the line segment making up of the object is changed according to an operation manner by the player, so that it is possible to generate the object having a complex shape with a simple operation.

A fifth aspect is according to the third aspect, and the object controlling program causes the computer to further function as a copy mover which moves a copy of the first object generated by the object generator at this point according to a moving course based on the operation inputs which have been detected until now by the input detector when a situation in which the distance between the temporally continuous coordinates is less than a constant distance continues.

According to certain example embodiments, in the course of generation of the object, it is possible to know the moving course of the object at this point, and therefore, it is possible to easily decide whether the generation of the object is to be continued or ended.

A sixth aspect is according to the first aspect, and the object mover changes a moving velocity of the first object when a predetermined condition is satisfied. For example, in a case that a specific operation is executed, or in a case that a specific event occurs, the moving velocity of the first object is made higher or lower.

According to certain example embodiments, the moving velocity of the object is changed, so that the moving course is also changed depending on the moving velocity. That is, it is hard to expect the moving course of the object, making it difficult to make the game simple or monotonous.

A seventh aspect is according to the sixth aspect, and the operation input by the player is coordinate data indicating coordinates on a display surface of a displayer. The object controlling program causes the computer to further function as a condition judger. The condition judger judges whether or not a predetermined condition is satisfied on the basis of a change of the coordinates indicated by a plurality of coordinate data.

According to certain example embodiments, whether or not the predetermined condition is satisfied is determined according to a change of the coordinates by the operation inputs by the player, and therefore, it is possible to determine whether or not the predetermined condition is satisfied on the basis of the operation input when the first object is drawn, for example.

An eighth aspect is according to the first aspect, and a second object different from the first object exists in a virtual space. An impacter gives an impact to at least a second object when the first object moved by the object mover hits the second object.

According to certain example embodiments, the second object is attacked by the first object, and therefore, the first object has to be drawn with the strategy devised, making the virtual game varied and interesting.

A ninth aspect is an object controlling apparatus and comprises an input detector which detects an operation input by a player, an object generator which generates an object according to the operation inputs detected by the input detector, and an object mover which moves the object generated by the object generator according to a moving course based on the operation inputs detected by the input detector.

According to the ninth aspect as well, similar to the first aspect, it is possible to increase interest in the game.

A tenth aspect is an object controlling method, and includes following steps of (a) detecting an operation input by a player, (b) generating an object according to the operation inputs detected by the step (a), and (c) moving the object generated by the step (b) according to a moving course based on the operation inputs detected by the step (a).

According to the tenth aspect as well, similar to the first aspect, it is possible to increase interest in the game.

The above described objects and other objects, features, aspects and advantages of certain example embodiments will become more apparent from the following detailed description when taken in conjunction with the accompanying drawings.

BRIEF DESCRIPTION OF THE DRAWINGS

FIG. 8 is an illustrative view showing an example of a thickness-of-line table according to thickness data and object information according to object data, shown in FIG. 7;

DETAILED DESCRIPTION

Figure 1:
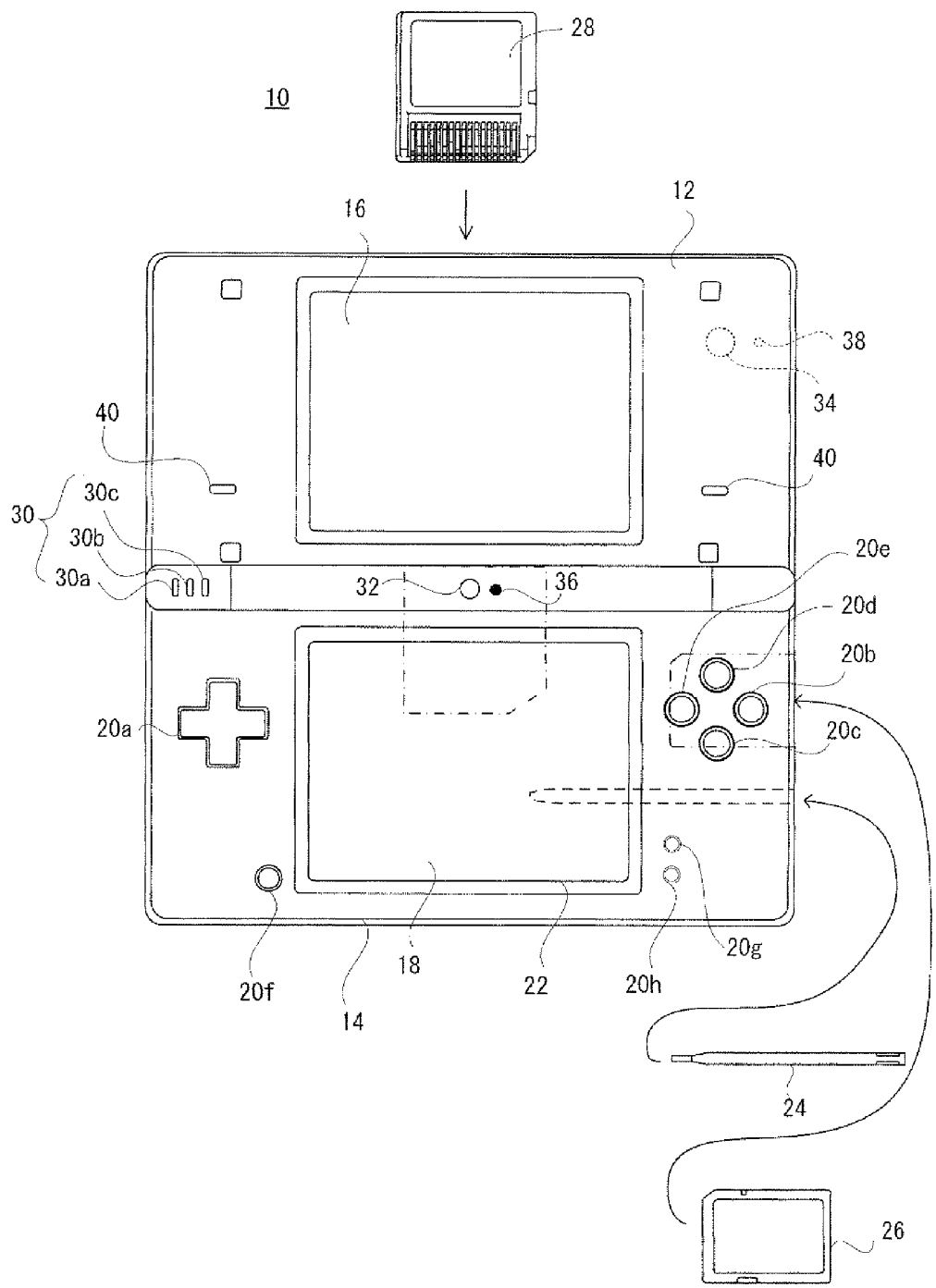
FIG. 1 is an illustrative view showing one embodiment of an external configuration of a game apparatus.

Referring to FIG. 1, a game apparatus 10 of one embodiment includes an upper housing 12 and a lower housing 14, and the upper housing 12 and the lower housing 14 are connected with each other so as to be opened or closed (foldable). In FIG. 1 example, the upper housing 12 and the lower housing 14 are constructed in the form of a horizontally long rectangular plate, and are rotatably connected with each other at the long sides of both of the housings. That is, the game apparatus 10 of this embodiment is a folding hand-held game apparatus, and in FIG. 1, the game apparatus 10 is shown in an opened state (in an open state). The game apparatus 10 is constructed such a size that the user can hold with both hands or one hand even in the open state.

Generally, the user uses the game apparatus 10 in the open state. Furthermore, the user keeps the game apparatus 10 in a close state when not using the game apparatus 10. Here, the game apparatus 10 can maintain an opening and closing angle formed between the upper housing 12 and the lower housing 14 at an arbitrary angle between the close state and open state by a friction force, etc. exerted at the connected portion as well as the aforementioned close state and open state. That is, the upper housing 12 can be fixed with respect to the lower housing 14 at an arbitrary angle.

Additionally, the game apparatus 10 is mounted with a camera (32, 34) described later, functioning as an imaging device, such as imaging an image with the camera (32, 34), displaying the imaged image on the screen, and saving the imaged image data.

As shown in FIG. 1, the upper housing 12 is provided with a first LCD 16, and the lower housing 14 is provided with a second LCD 18. The first LCD 16 and the second LCD 18 take a horizontally-long shape, and are arranged such that the directions of the long sides thereof are coincident with the long sides of the upper housing 12 and the lower housing 14. For example, resolutions of the first LCD 16 and the second LCD 18 are set to 256 (horizontal)×192 (vertical) pixels (dots).

In addition, although an LCD is utilized as a display in this embodiment, an EL (Electronic Luminescence) display, a plasmatic display, etc. may be used in place of the LCD. Furthermore, the game apparatus 10 can utilize a display with an arbitrary resolution.

Figure 2:
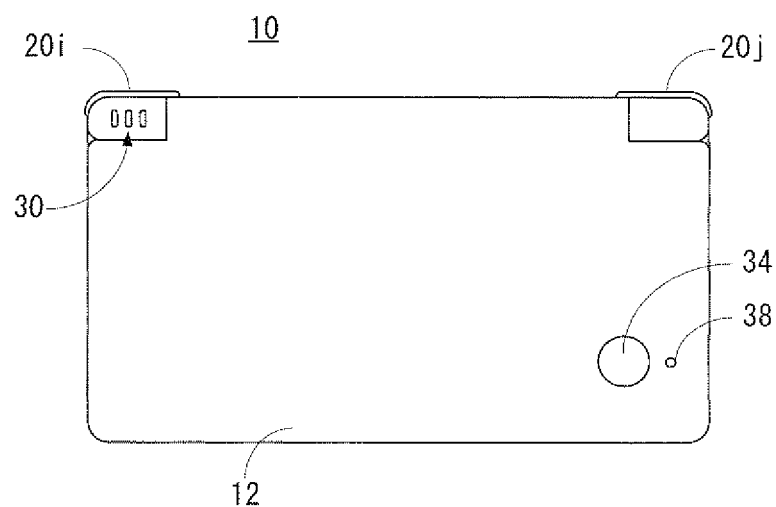
FIG. 2 is a top view and a left side view of the game apparatus shown in FIG. 1 which is in a folded state.
Figure 2:
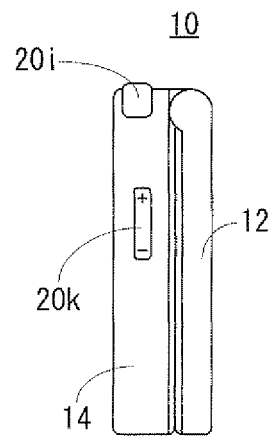

As shown in FIG. 1 and FIG. 2, the lower housing 14 is provided with respective operation buttons 20a-20k as an input device. Out of the respective operation buttons 20a-20k, the direction input button 20a, the operation button 20b, the operation button 20c, the operation button 20d, the operation button 20e, the power button 20f, the start button 20g, and the select button 20h are provided on the surface (inward surface) to which the second LCD 18 of the lower housing 14 is set. More specifically, the direction input button 20a and the power button 20f are arranged at the left of the second LCD 18, and the operation buttons 20b-20e, 20g and 20h are arranged at the right of the second LCD 18. Furthermore, when the upper housing 12 and the lower housing 14 are folded, the operation buttons 20a-20h are enclosed within the game apparatus 10.

The direction input button (cross key) 20a functions as a digital joystick, and is used for instructing a moving direction of a player object, moving a cursor, and so forth. Each operation buttons 20b-20e is a push button, and is used for causing the player object to make an arbitrary action, executing a decision and cancellation, and so forth. The power button 20f is a push button, and is used for turning on or off the main power supply of the game apparatus 10. The start button 20g is a push button, and is used for temporarily stopping (pausing), starting (restarting) a game, and so forth. The select button 20h is a push button, and is used for a game mode selection, a menu selection, etc.

Although operation buttons 20i-20k are omitted in FIG. 1, as shown in FIG. 2 (A), the operation button (L button) 20i is provided at the left corner of the upper side surface of the lower housing 14, and the operation button (R button) 20j is provided at the right corner of the upper side surface of the lower housing 14. Furthermore, as shown in FIG. 2 (B), the volume button 20k is provided on the left side surface of the lower housing 14.

FIG. 2 (A) is an illustrative view of the game apparatus 10 in a folded manner as seen from a top surface (upper housing 12). FIG. 2 (B) is an illustrative view of the game apparatus 10 in a folded manner when seen from a left side surface.

The L button 20i and the R button 20j are push buttons, and can be used for similar operations to those of the operation buttons 20b-20e, and can be used as subsidiary operations of these operation buttons 20b-20e. Furthermore, in this embodiment, the L button 20i and the R button 20j can be also used for an operation of a imaging instruction (shutter operation). The volume button 20k is made up of two push buttons, and is utilized for adjusting the volume of the sound output from two speakers (right speaker and left speaker) not shown. In this embodiment, the volume button 20k is provided with an operating portion including two push portions, and the aforementioned push buttons are provided by being brought into correspondence with the respective push portions. Thus, when the one push portion is pushed, the volume is made high, and when the other push portion is pushed, the volume is made low. For example, when the push portion is hold down, the volume is gradually made high, or the volume is gradually made low.

Returning to FIG. 1, the game apparatus 10 is provided with a touch panel 22 as an input device separate from the operation buttons 20a-20k. The touch panel 22 is attached so as to cover the screen of the second LCD 18. In this embodiment, a touch panel of a resistance film system is used as the touch panel 22, for example. However, the touch panel 22 can employ an arbitrary push-type touch panel without being restricted to the resistance film system. Furthermore, in this embodiment, as the touch panel 22, a touch panel having the same resolution (detection accuracy) as the resolution of the second LCD 18, for example, is utilized. However, the resolution of the touch panel 22 and the resolution of the second LCD 18 are not necessarily coincident with each other.

Additionally, at the right side surface of the lower housing 14, a loading slot (represented by a dashed line shown in FIG. 1) is provided. The loading slot can house a touch pen 24 to be utilized for performing an operation on the touch panel 22. Generally, an input with respect to the touch panel 22 is performed with the touch pen 24, but it may be performed with a finger of the user beyond the touch pen 24. Accordingly, in a case that the touch pen 24 is not to be utilized, the loading slot for the touch pen 24 and the housing portion need not to be provided.

Moreover, on the right side surface of the lower housing 14, a loading slot for housing a memory card 26 (represented by a chain double-dashed line in FIG. 1) is provided. Inside of the loading slot, a connector (not illustrated) for electrically connecting the game apparatus 10 and the memory card 26 is provided. The memory card 26 is an SD card, for example, and detachably attached to the connector. This memory card 26 is used for storing (saving) an image imaged by the game apparatus 10, and reading the image generated (imaged) or stored by another apparatus in the game apparatus 10.

In addition, on the upper side surface of the lower housing 14, a loading slot (represented by an alternate long and short dash line FIG. 1) for housing a memory card 28 is provided. Inside the loading slot, a connector (not illustrated) for electrically connecting the game apparatus 10 and the memory card 28 is provided. The memory card 28 is a recording medium of recording an information processing program, necessary data, etc. and is detachably attached to the loading slot provided to the lower housing 14.

At the left end of the connected portion (hinge) between the upper housing 12 and the lower housing 14, an indicator 30 is provided. The indicator 30 is made up of three LEDs 30a, 30b, 30c. Here, the game apparatus 10 can make a wireless communication with another appliance, and the first LED 30a lights up when a wireless communication with the appliance is established. The second LED 30b lights up while the game apparatus 10 is recharged. The third LED 30c lights up when the main power supply of the game apparatus 10 is turned on. Thus, by the indicator 30 (LEDs 30a-30c), it is possible to inform the user of a communication-established state, a charge state, and a main power supply on/off state of the game apparatus 10.

As described above, the upper housing 12 is provided with the first LCD 16. In this embodiment, the touch panel 22 is set so as to cover the second LCD 18, but the touch panel 22 may be set so as to cover the first LCD 16. Alternatively, two touch panels 22 may be set so as to cover the first LCD 16 and the second LCD 18. For example, on the second LCD 18, an operation explanatory screen for teaching the user how the respective operation buttons 20a-20k and the touch panel 22 work or how to operate them, and a game screen are displayed.

Additionally, the upper housing 12 is provided with the two cameras (inward camera 32 and outward camera 34). As shown in FIG. 1, the inward camera 32 is attached in the vicinity of the connected portion between the upper housing 12 and the lower housing 14 and on the surface to which the first LCD 16 is provided such that the display surface of the first LCD 16 and the imaging surface are in parallel with each other or are leveled off. On the other hand, the outward camera 34 is attached to the surface being opposed to the surface to which the inward camera 32 is provided as shown in FIG. 2 (A), that is, on the outer surface of the upper housing 12 (the surface turns to the outside when the game apparatus 10 is in a close state, and on the back surface of the upper housing 12 shown in FIG. 1). Here, in FIG. 1, the outward camera 34 is shown by a dashed line.

Accordingly, the inward camera 32 can image a direction to which the inner surface of the upper housing 12 is turned, and the outward camera 34 can image a direction opposite to the imaging direction of the inward camera 32, that is, can image a direction to which the outer surface of the upper housing 12 is turned. Thus, in this embodiment, the two cameras 32, 34 are provided such that the imaging directions of the inward camera 32 and the outward camera 34 are the opposite direction with each other. For example, the user holding the game apparatus 10 can image a landscape (including the user, for example) as the user is seen from the game apparatus 10 with the inward camera 32, and can image a landscape and other user as the direction opposite to the user is seen from the game apparatus 10 with the outward camera 34.

Additionally, on the internal surface near the aforementioned connected portion, a microphone 84 (see FIG. 3) is housed as a voice input device. Then, on the internal surface near the aforementioned connected portion, a through hole 36 for the microphone 84 is formed so as to detect a sound outside the game apparatus 10. The position for housing the microphone 84 and the position of the through hole 36 for the microphone 84 are not necessarily on the aforementioned connected portion, and the microphone 84 may be housed in the lower housing 14, and the through hole 36 for the microphone 84 may be provided to the lower housing 14 in correspondence with the housing position of the microphone 84.

Furthermore, on the outer surface of the upper housing 12, in the vicinity of the outward camera 34, a fourth LED 38 (dashed line in FIG. 1) is attached. The fourth LED 38 lights up at a time when an imaging is made with the inward camera 32 or the outward camera 34 (shutter button is pushed). Furthermore, in a case that a motion image is imaged with the inward camera 32 or the outward camera 34, the fourth LED 38 continues to light up during the imaging. That is, by making the fourth LED 38 light up, it is possible to inform an object to be imaged or his or her surrounding that an imaging with the game apparatus 10 is made (is being made).

Moreover, the upper housing 12 is formed with a sound release hole 40 on both sides of the first LCD 16. The above-described speaker is housed at a position corresponding to the sound release hole 40 inside the upper housing 12. The sound release hole 40 is a through hole for releasing the sound from the speaker to the outside of the game apparatus 10.

As described above, the upper housing 12 is provided with the inward camera 32 and the outward camera 34 which are constituted to image an image and the first LCD 16 as a displayer for mainly displaying the imaged image and a game screen. On the other hand, the lower housing 14 is provided with the input device (operation button 20 (20a-20k) and the touch panel 22) for performing an operation input to the game apparatus 10 and the second LCD 18 as a displayer for mainly displaying an operation explanatory screen and a game screen. Accordingly, the game apparatus 10 has two screens (16, 18) and two kinds of operating portions (20, 22).

Figure 3:
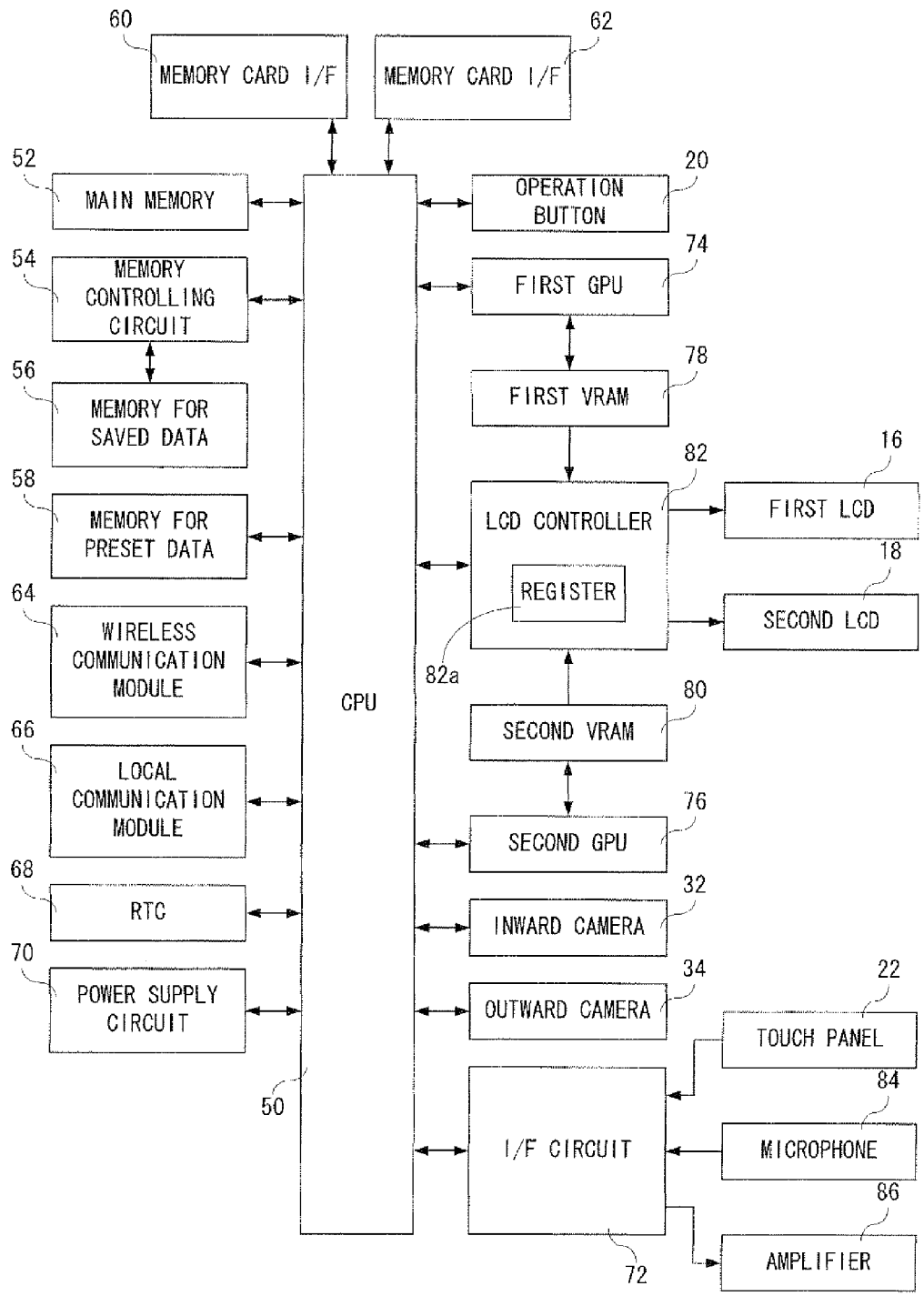
FIG. 3 is a block diagram showing an electric configuration of the game apparatus shown in FIG. 1.

FIG. 3 is a block diagram showing an electric configuration of the game apparatus 10 of this embodiment. As shown in FIG. 3, the game apparatus 10 includes electronic components, such as a CPU 50, a main memory 52, a memory controlling circuit 54, a memory for saved data 56, a memory for preset data 58, a memory card interface (memory card I/F) 60, a memory card I/F 62, a wireless communication module 64, a local communication module 66, a real-time clock (RTC) 68, a power supply circuit 70, and an interface circuit (I/F circuit) 72, a first GPU (Graphics Processing Unit) 74, a second GPU 76, a first VRAM (Video RAM) 78, a second VRAM 80, an LCD controller 82, etc. These electronic components (circuit components) are mounted on an electronic circuit board, and housed in the lower housing 14 (or the upper housing 12 may also be appropriate).

The CPU 50 is an information processing means for executing a predetermined program. In this embodiment, the predetermined program is stored in a memory (memory for saved data 56, for example) within the game apparatus 10 and the memory card 26 and/or 28, and the CPU 50 executes information processing described later by executing the predetermined program.

Here, the program to be executed by the CPU 50 may be previously stored in the memory within the game apparatus 10, acquired from the memory card 26 and/or 28, and acquired from another appliance by communicating with this another appliance.

The CPU 50 is connected with the main memory 52, the memory controlling circuit 54, and the memory for preset data 58. The memory controlling circuit 54 is connected with the memory for saved data 56. The main memory 52 is a memory means to be utilized as a work area and a buffer area of the CPU 50. That is, the main memory 52 stores (temporarily stores) various data to be utilized in the aforementioned information processing, and stores a program from the outside (memory cards 26 and 28, and another appliance). In this embodiment, as a main memory 52, a PSRAM (Pseudo-SRAM) is used, for example. The memory for saved data 56 is a memory means for storing (saving) a program to be executed by the CPU 50, data of an image imaged by the inward camera 32 and the outward camera 34, etc. The memory for saved data 56 is constructed by a nonvolatile storage medium, and can utilize a NAND type flash memory, for example. The memory controlling circuit 54 controls reading and writing from and to the memory for saved data 56 according to an instruction from the CPU 50. The memory for preset data 58 is a memory means for storing data (preset data), such as various parameters, etc. which are previously set in the game apparatus 10. As a memory for preset data 58, a flash memory to be connected to the CPU 50 through an SPI (Serial Peripheral Interface) bus can be used.

Both of the memory card I/Fs 60 and 62 are connected to the CPU 50. The memory card I/F 60 performs reading and writing data from and to the memory card 26 attached to the connector according to an instruction form the CPU 50. Furthermore, the memory card I/F 62 performs reading and writing data from and to the memory card 28 attached to the connector according to an instruction form the CPU 50. In this embodiment, image data corresponding to the image imaged by the inward camera 32 and the outward camera 34 and image data received by other devices are written to the memory card 26, and the image data stored in the memory card 26 is read from the memory card 26 and stored in the memory for saved data 56, and sent to other devices. Furthermore, the various programs stored in the memory card 28 is read by the CPU 50 so as to be executed.

Here, the information processing program such as a game program is not only supplied to the game apparatus 10 through the external storage medium, such as a memory card 28, etc. but also is supplied to the game apparatus 10 through a wired or a wireless communication line. In addition, the information processing program may be recorded in advance in a nonvolatile storage device inside the game apparatus 10. Additionally, as an information storage medium for storing the information processing program, an optical disk storage medium, such as a CD-ROM, a DVD or the like may be appropriate beyond the aforementioned nonvolatile storage device.

The wireless communication module 64 has a function of connecting to a wireless LAN according to an IEEE802.11.b/g standard-based system, for example. The local communication module 66 has a function of performing a wireless communication with the same types of the game apparatuses by a predetermined communication system. The wireless communication module 64 and the local communication module 66 are connected to the CPU 50. The CPU 50 can receive and send data over the Internet with other appliances by means of the wireless communication module 64, and can receive and send data with the same types of other game apparatuses by means of the local communication module 66.

Furthermore, the CPU 50 is connected with the RTC 68 and the power supply circuit 70. The RTC 68 counts a time to output the same to the CPU 50. For example, the CPU 50 can calculate a date and a current time, etc. on the basis of the time counted by the RTC 68. The power supply circuit 70 controls power supplied from the power supply (typically, a battery accommodated in the lower housing 14) included in the game apparatus 10, and supplies the power to the respective circuit components within the game apparatus 10.

Also, the game apparatus 10 includes the microphone 84 and an amplifier 86. Both of the microphone 84 and the amplifier 86 are connected to the I/F circuit 72. The microphone 84 detects a voice and a sound (clap and handclap, etc.) of the user produced or generated toward the game apparatus 10, and outputs a sound signal indicating the voice or the sound to the I/F circuit 72. The amplifier 86 amplifies the sound signal applied from the I/F circuit 72, and applies the amplified signal to the speaker (not illustrated). The I/F circuit 72 is connected to the CPU 50.

The touch panel 22 is connected to the I/F circuit 72. The I/F circuit 72 includes a sound controlling circuit for controlling the microphone 84 and the amplifier 86 (speaker), and a touch panel controlling circuit for controlling the touch panel 22. The sound controlling circuit performs an A/D conversion and a D/A conversion on a sound signal, or converts a sound signal into sound data in a predetermined format. The touch panel controlling circuit generates touch position data in a predetermined format on the basis of a signal from the touch panel 22 and outputs the same to the CPU 50. For example, touch position data is data indicating coordinates of a position where an input is performed on an input surface of the touch panel 22.

Additionally, the touch panel controlling circuit performs reading of a signal from the touch panel 22 and generation of the touch position data per each predetermined time. By fetching the touch position data via the I/F circuit 72, the CPU 50 can know the position on the touch panel 22 where the input is made.

The operation button 20 is made up of the aforementioned respective operation buttons 20a-20k, and connected to the CPU 50. The operation data indicating a input state (whether or not to be pushed) with respect to each of the operation buttons 20a-20k is output from the operation button 20 to the CPU 50. The CPU 50 acquires the operation data from the operation button 20, and executes processing according to the acquired operation data.

Both of the inward camera 32 and the outward camera 34 are connected to the CPU 50. The inward camera 32 and the outward camera 34 image images according to an instruction from the CPU 50, and output image data corresponding to the imaged images to the CPU 50. In this embodiment, the CPU 50 issues an imaging instruction to any one of the inward camera 32 and the outward camera 34 while the camera (32, 34) which has received the imaging instruction images an image and sends the image data to the CPU 50.

The first GPU 74 is connected with the first VRAM 78, and the second GPU 76 is connected with the second VRAM 80. The first GPU 74 generates a first display image on the basis of data for generating the display image stored in the main memory 52 according to an instruction from the CPU 50, and draws the same in the first VRAM 78. The second GPU 76 similarly generates a second display image according to an instruction form the CPU 50, and draws the same in the second VRAM 80. The first VRAM 78 and the second VRAM 80 are connected to the LCD controller 82.

The LCD controller 82 includes a register 82a. The register 82a stores a value of "0" or "1" according to an instruction from the CPU 50. In a case that the value of the register 82a is "0", the LCD controller 82 outputs the first display image drawn in the first VRAM 78 to the second LCD 18, and outputs the second display image drawn in the second VRAM 80 to the first LCD 16. Furthermore, in a case that the value of the register 82a is "1", the LCD controller 82 outputs the first display image drawn in the first VRAM 78 to the first LCD 16, and outputs the second display image drawn in the second VRAM 80 to the second LCD 18.

Figure 4:
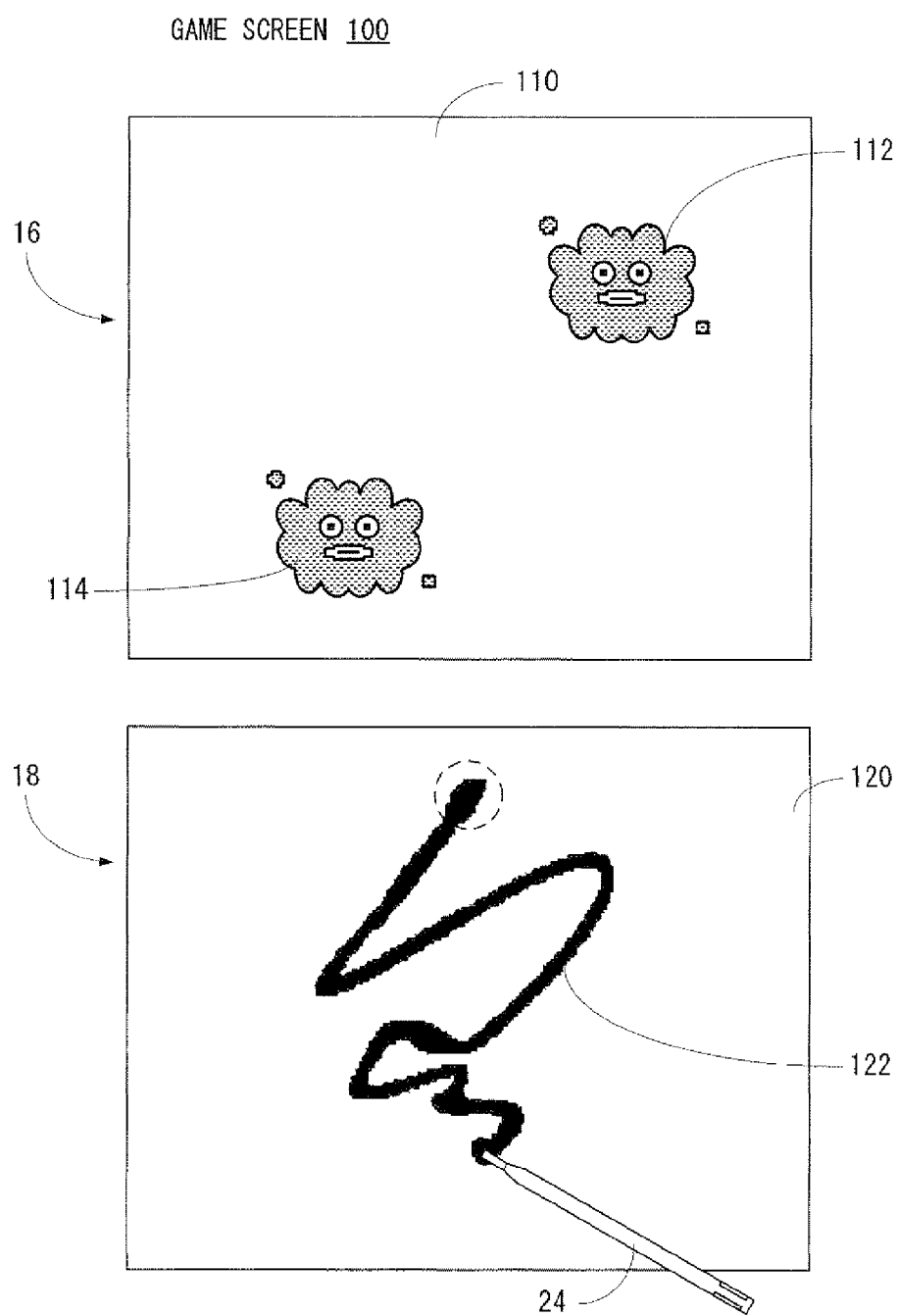
FIG. 4 is an illustrative view showing an example of a game screen to be displayed on an LCD of the game apparatus shown in FIG. 1.

FIG. 4 shows one example of a game screen 100 in a case that a virtual game of this embodiment is played. The game screen 100 is made up of an upper screen 110 and a lower screen 120. As understood from FIG. 4, an upper screen 110 is displayed on the first LCD 16, and a lower screen 120 is displayed on the second LCD 18. The game screen 100, although illustration is omitted, is an image obtained by imaging a two-dimensional or a three-dimensional virtual space with a virtual camera. Furthermore, the virtual space is set to a range wider than display areas of the upper screen 110 and the lower screen 120, for example, and an object (112, 114, 116, 122) as described later move in the virtual space.

Here, on the game screen 100 shown in FIG. 4, a background is omitted for simplicity.

On the upper screen 110, an enemy object (enemy object) 112 which imitates a cloud and an enemy object 114 are displayed. On the lower screen 120, an object (drawn object) 122 which is drawn (generated) by the player by utilizing the touch pen 24 is displayed.

Although it is difficult to comprehend in the drawing, in the virtual game of this embodiment, the drawn object 122 generated according to a touch operation by the player is moved according to a moving course based on a locus of the touch operation. When the drawn object 122 hits the enemy object 112, 114, it can give damage (offensive force) on the enemy object 112, 114. Furthermore, when the damage given by the drawn object 122 exceeds the life (stamina) of the enemy object 112, 114, the enemy object 112,114 is made to disappear. Although illustration is omitted, in this embodiment, a hit judging polygon having a shape (size) the same or approximately the same as the drawn object 122 is set. Here, the hit judging polygon is colorless and transparent.

Furthermore, in a case that the drawn object 122 and the enemy object 112, 114 hit with each other for the first time, only when the hit portion is a leading end portion (portion encircled by the dotted line in FIG. 4) of the drawn object 122, the enemy object 112, 114 can be damaged. This is because that if whichever portion of the drawn object 122 is allowed to be hit, the enemy object 112, 114 is easily attacked. The leading end portion includes a drawing start position when the drawn object 122 is drawn, and a predetermined length successive thereto (length of 5-10 dots), for example.

It should be noted that in this embodiment, only when the drawn object 122 hits the enemy object 112,114 from the leading end portion, the enemy object 112, 114 is damaged, but this is not restricted thereto. Irrespective from which portion the drawn object 122 hits the enemy object 112, 114, the enemy object 112, 114 may be damaged. For example, these may be used depending on the game levels.

For example, when it is successful to cause all the enemy objects 112, 114 disappear within a time limit (or within the limited number of attacks), the game is to be cleared. On the other hand, before all the enemy objects 112, 114 are caused to disappear, when the time limit (or the limited number of attacks) is exceeded, the game is over.

Here, an explanation is made on generating processing and a movement control of the drawn object 122. For example, when the player starts a touch operation by utilizing the touch pen 24, that is, when a touch-off state switches to a touch-on state, sampling of the coordinate data detected via the touch panel 22 is started. Here, in order to remove a mere unintentional movement of the game apparatus 10 or the touch pen 24, in a case that a distance d1 from the coordinates indicating a previously detected coordinate data is equal to or less than a constant distance L1 (3 dots, for example), the current coordinate data is not sampled.

The sampling continues until the end of the touch operation, that is, until the touch-on state switches to the touch-off state. Furthermore, in parallel with the sampling of the coordinate data, the drawn object 122 is generated (drawn). More specifically, temporally continuous two coordinates are connected with a line (line segment). Here, depending on the distance d1 between the temporally continuous two coordinates, the thickness of the line (line segment) is variably set. The distance d between the two coordinates is calculated according to Equation 1. Here, one of the coordinates is regarded as (x1, y1), and the other of the coordinates is regarded as (x2, y2). This is applied to a case that the distance d between the coordinates is calculated below.

$$d=\sqrt{\{(x1-x2)^2+(y1-y2)^2\}}$$ [Equation 1]

In this embodiment, in a case that the distance d1 is short (is equal to or more than 3 dots and less than 8 dots), the thickness of the line is set to bold (5 dots). Furthermore, in a case that the distance d1 is normal (middle) (is equal to or more than 8 dots and less than 12 dots), the thickness of the line is set to normal (3 dots). Moreover, in a case that the distance d1 is long (is equal to or more than 12 dots), the thickness of the line is set to fine (1 dot). Moreover, depending on the thickness of the line, the size of the damage (attack) applied to the enemy object 112, 114 is made different. In this embodiment, the bolder the line, the more the damage given to the enemy object 112, 114 is.

In this embodiment, the shorter the distance d1 is, the bolder the line is, and the more the damage to be given is, and vice versa. That is, the shorter the distance d1 is, the finer the line is, and the less the damage is.

In this manner, until the touch operation is absent, the sampling of the coordinate data and generation of the drawn object 122 are performed. Here, when a total number of sampled coordinate data reaches a maximum value (200, for example), the generation of the drawn object 122 is forcedly ended.

After completion of generating the drawn object 122, the drawn object 122 starts to move. In this embodiment, the drawn object 122 moves according to a moving course based on its own locus. Here, when the moving course is decided by utilizing all the coordinates making up of the drawn object 122, an enormous amount of processing is required, and therefore, in this embodiment, the moving course is decided by utilizing a part of the coordinates. Thus, coordinates are searched from the drawing start position in order (search reference), and the coordinates for which a distance d2 with the coordinates immediately before is equal to or less than a constant distance L2 (10 dots, for example) is removed. That is, only the coordinates for which the distance d2 with the coordinates immediately before is above the constant distance L2 are extracted. Then, on the basis of the plurality of extracted coordinates, a vector (direction vector) for deciding a direction in which the drawn object 122 is moved is calculated. Here, in this embodiment, by the drawn object 122 drawn on the lower screen 120, the enemy object 112, 114 existing on the upper screen 110 is attacked, so that the direction vector of the drawn object 122 is decided in order so as to draw the moving course based on the locus of the drawn object 122 from the trailing end of the drawn object 122.

More specifically, in a case that n coordinates are extracted from the coordinates at the drawing start position to the coordinates at the drawing end position, a direction vector $V_h$ is calculated according to Equation 2.

$$V_h = \text{coordinates}_{n-2} - \text{coordinates}_n$$ [Equation 2]

Figure 5:
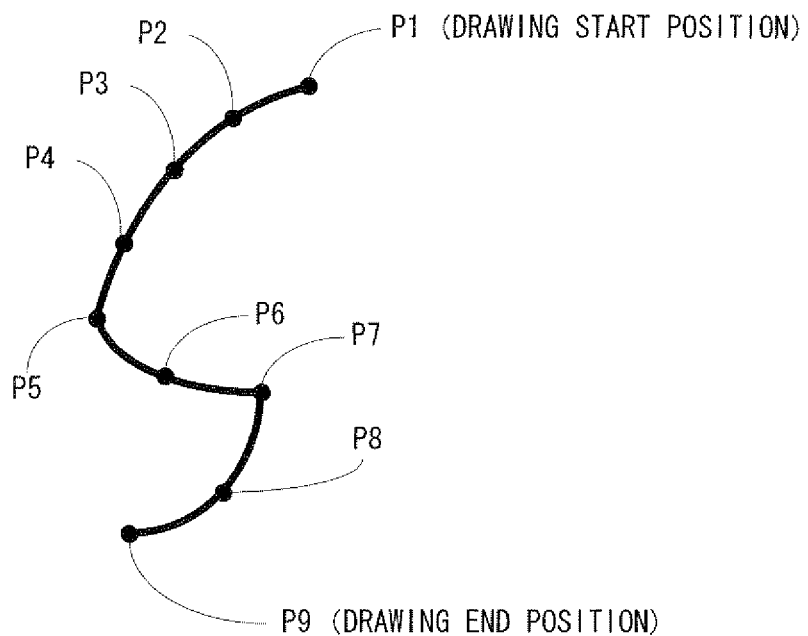
FIG. 5 is an illustrative view showing an example of a drawn object and explaining a producing method of a direction vector based on a locus of the drawn object.
Figure 5:
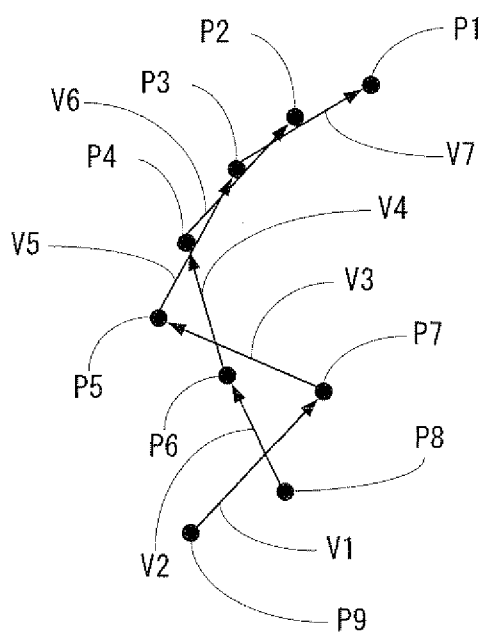

Here, the direction vector $V_h$ having the n-th coordinates as a starting point and n−2-th coordinates$_{n-2}$ as an endpoint is calculated every time that n is subtracted by 1. Accordingly, for example, as to the drawn object 122 shown in FIG. 5(A), in a case that the coordinates n (n=1, 2, . . . , 9) from a point P1 to a point P9 are detected, seven direction vectors $V_1$-$V_7$ can be obtained as shown in FIG. 5(B). More specifically, the first direction vector $V_1$ has the point P9 as a starting point and the point P7 as an endpoint. The second direction vector $V_2$ has the point P8 as a starting point and the point P6 as an endpoint. The third direction vector $V_3$ has the point P7 as a starting point, and the point P5 as an endpoint. Similarly, calculation according to Equation 2 is made as to the seventh (the last) vector $V_7$.

Here, because only its direction is used, the direction vector $V_h$, may be represented by a unit vector having a magnitude of 1 by dividing each vector with its own magnitude.

In this embodiment, the drawn object 122 moves by a predetermined number of frames (3 frames in this embodiment) in a direction represented by the decided direction vector $V_h$ at a constant moving velocity A (see Equation 3). Here, the frame is a screen updating rate (1/60 seconds). In a case that the drawn object 122 is out of the game screen 100 (first LCD 16 and second LCD 18) during movement, the movement of the drawn object 122 is ended. However, if even a part of the drawn object 122 is displayed on the game screen 100, the drawn object 122 continues to move, and after completion of movement according to the last direction vector $V_h$, the drawn object 122 continues to move in the direction of the last direction vector $V_h$ until it is out of the game screen 100.

$$\text{moving velocity } A = \text{reference velocity } A_0 + \text{flipping velocity } \alpha$$ [Equation 3]

Here, the reference velocity $A_0$ is a velocity set in advance by a programmer or a developer in advance, and set to a numerical value empirically obtained. Furthermore, the flipping velocity $\alpha$ is given according to Equation 4.

$$\text{flipping velocity } \alpha = \text{maximum distance } d_{max} \times \text{constant } C$$ [Equation 4]

Here, the constant C is set to a numerical value empirically obtained by examinations, etc.

The flipping velocity $\alpha$ is explained, here. In this embodiment, as described above, the drawn object 122 is generated, but when generating (drawing) of the drawn object 122 is ended, the player makes a touch-off operation so as to flip the touch panel 22 with the touch pen 24 to thereby increase the moving velocity A.

Accordingly, in this embodiment, when a touch operation is ended, it is detected whether or not a flipping operation is made. If a flipping operation is made, a flipping velocity α in response thereto is calculated according to Equation 4, and it is reflected on the moving velocity A. Here, if it is determined that no flipping operation is made, the flipping velocity α=0.

More specifically, the coordinates indicated by the sampled coordinate data are detected in reverse chronological order from the trailing end, and a distance d3 with the coordinates immediate before is sequentially calculated. Furthermore, it is determined whether or not the distance d3 is equal to or less than a constant distance L3 (3 dots), and the coordinates when the distance d3 is equal to or less than the constant distance L3 (point) is regarded as a starting position of a flipping operation. Then, from the starting position of the flipping operation to the trailing end of the drawn object 122 (drawing end position), a maximum distance d3 (maximum distance $d_{max}$) is extracted to thereby calculate a flipping velocity a according to Equation 4. Furthermore, at this time, the coordinate data corresponding to the coordinates from the starting position of the flipping operation to the end thereof are precluded. This is because that the flipping operation is considered as an operation separate from the operation for drawing (generating) the drawn object 122. Accordingly, a flipping direction does not have an effect on a moving direction of the drawn object 122.

Furthermore, when the flipping velocity α is added by the flipping operation, the distance by which the drawn object 122 moves during one frame is made longer. Thus, in a case that a flipping operation is made, the drawn object 122 moves according to a moving course little longer than a moving course when no flipping operation is made.

Although detailed explanation is omitted, the flipping operation is executed when drawing the drawn object 122 is ended, and therefore, the presence or absence of the flipping operation is detected by using the coordinates at a point of the trailing end to the coordinates at a predetermined point (20, for example) temporally backward out of the sampled coordinates. In a case that a flipping operation is made, the flipping velocity α is calculated.

Figure 6:
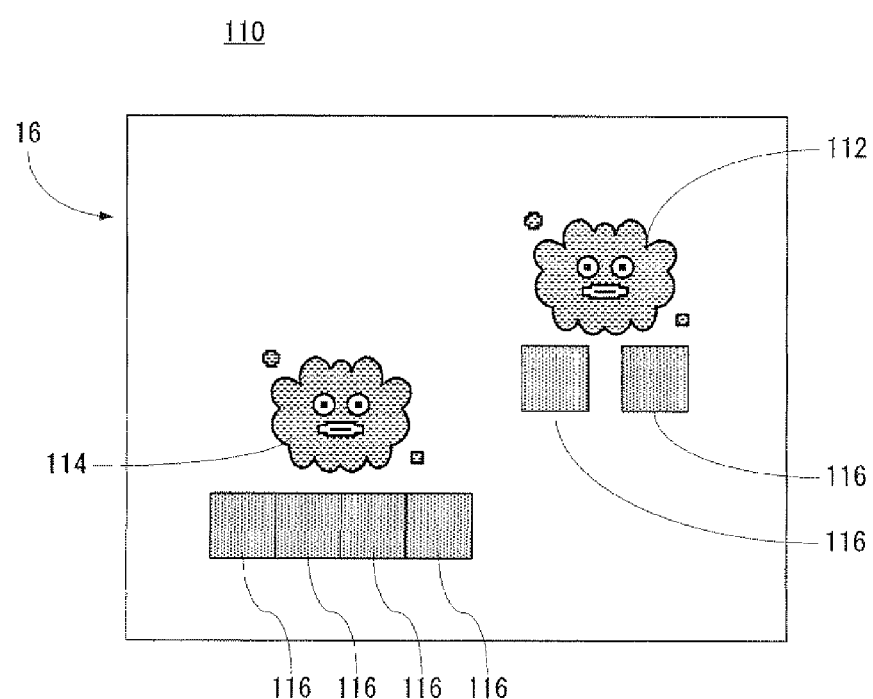
FIG. 6 is an illustrative view showing a part of another example of the game screen to be displayed on the LCD of the game apparatus shown in FIG. 1.

For example, as shown in FIG. 6, on another game screen 100, a plurality of block objects 116 are arranged so as to protect the enemy object 112, 114 displayed on the upper screen 110. As described above, if the leading end portion of the drawn object 122 does not hit the enemy object 112, 114, the enemy object 112,114 cannot be damaged. Thus, in a case that the player intends to damage the enemy object 112, it is necessary that a narrow rod-shaped drawn object 122, for example, is generated, and with it, the enemy object 112 is attacked from the space between the two block objects 116. Furthermore, in a case that the player intends to damage the enemy object 114, it is necessary that a drawn object 122 like an inequality sign (<, >), for example, is generated, and the enemy object 114 is attacked from a lateral direction. Thus, the player generates the drawn object 122 while calculating a moving course of the drawn object 122 when the enemy object 112, 114 is attacked.

Here, the block object 116 may be made to disappear, or may not be made to disappear, in response to the drawn object 122 being hit. In either case, as described above, if all the enemy objects 112, 114 are not defeated within the time limit (within the limited number of attacks), the game is not to be cleared. Although illustration is omitted, the enemy object 112, 114 may move within the game screen 100 (game space) under the control of the computer (CPU 50).

Figure 7:
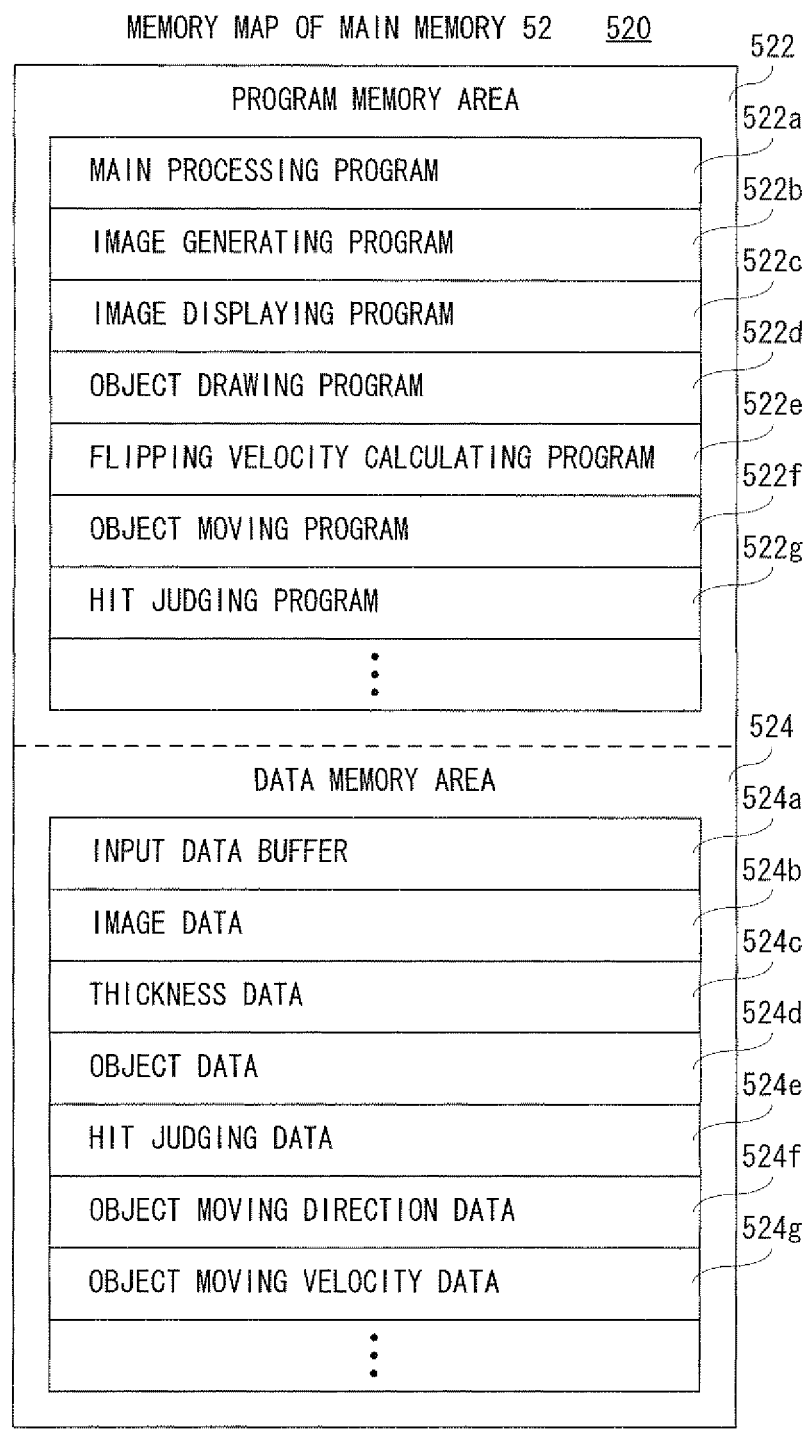
FIG. 7 is an illustrative view showing a memory map of a main memory shown in FIG. 3.

FIG. 7 is an illustrative view showing an example of a memory map 520 of a main memory 52 shown in FIG. 3. As shown in FIG. 7, the main memory 52 includes a program memory area 522 and a data memory area 524. The program memory area 522 stores a game program as an information processing program, and the game program is made up of a main processing program 522*a*, an image generating program 522*b*, an image displaying program 522*c*, an object drawing program 522*d*, a flipping velocity calculating program 522*e*, an object moving program 522*f*, a hit judging program 522*g*, etc.

The main processing program 522*a* is a program for processing a main routine of the virtual game of this embodiment. The image generating program 522*b* is a program for generating game image data to display a game screen (100, etc.) on the first LCD 16 and the second LCD 18 by utilizing image data 524*b* and object data 524*d*. The image displaying program 522*c* is a program for displaying the game image data generated according to the image generating program 522*b* on the first LCD 16 and the second LCD 18 as a game screen (100, etc.).

The object drawing program 522*d* generates image data of the drawn object 122 according to the object data 524*d* generated on the basis of the coordinate data that is input in response to a touch operation by the player. That is, the object drawing program 522*d* connects the coordinates indicated by the current coordinate data and the coordinates indicated by the coordinate data immediate before with a line segment having a thickness depending on the distance d1 between the two coordinates every time that coordinate data is sampled.

The flipping velocity calculating program 522*e* is a program for detecting a presence or absence of a flipping operation by utilizing a predetermined number of coordinates data from the last coordinate data of the object data 524, and calculating a flipping velocity α if a flipping operation is made based on a maximum distance $d_{max}$.

The object moving program 522*f* is a program for moving the drawn object 122 on the game screen 100 (game space). More specifically, the object moving program 522*f* extracts only the coordinates for which the distance d2 with the coordinates immediate before is above the constant distance L2 (10 dots) from all the coordinates from the drawing start position to the drawing end position with reference to the object data 524*d*, and calculates a direction vector $V_h$ (object moving direction data 524*f*) as described above. Furthermore, the object moving program 522*f* calculates a moving velocity A (object moving velocity data 524*g*) of the drawn object 122 according to Equation 3 by utilizing the flipping velocity α calculated according to the flipping velocity calculating program 522*e*. Then, the object moving program 522*f* moves the drawn object 122 according to the calculated direction vector $V_h$ and the calculated moving velocity A.

The hit judging program 522*g* determines a hit with the enemy object 112, 114 and the block object 116, and the drawn object 122. Here, as described above, only when the leading end portion of the drawn object 122 first hits the enemy object 112, 114, the enemy object 112, 114 can be damaged.

Although illustration is omitted, the program memory area 522 also stores a sound output program and a backup program. The sound output program is a program for outputting a sound necessary for the game, such as a voice (onomatopoeic sound) of the game object, a sound effect, music, etc. The backup program is a program for storing (saving) the game data (proceeding data and result data) in the memory card 26, and the memory for saved data 56 according to a game event and an instruction by the player.

The data memory area 524 is provided with an input data buffer 524*a*. The input data buffer 524*a* is provided for storing (temporarily storing) the operation data from the operation button 20 and the coordinate data from the touch panel 22 in chronological order.

Furthermore, the data memory area 524 stores image data 524b, thickness data 524c, object data 524d, hit judging data 524e, object moving direction data 524f, object moving velocity data 524g.

The image data 524b is data, such as polygon data, texture data, etc. for generating game image data. The thickness data 524c is table data for deciding the thickness of the line (line segment) of the drawn object 122. In FIG. 8(A), a thickness-of-line table according to the thickness data 524c is shown. More specifically, depending on the thickness of the line, the number of dots and the damage (offensive power) are described. In this embodiment, the number of dots (1, 3, 5) is described in correspondence with each of the three kinds of thickness (fine, normal, bold), and the numerical value (numerical value to be subtracted from the stamina of the enemy object) of the damage to be given to the enemy object 112, 114 is described. However, this is merely one example, and there is no need of being restricted thereto. The thickness may be classified into four kinds or more if only it is two kinds or more.

Returning to FIG. 7, the object data 524d is data indicating information of the drawn object 122, and is generated by sampling the coordinate data according to touch operations by the player, and determining the thickness of the line (line segment) connecting the coordinates depending on the distance d1 between the coordinates. As shown in FIG. 8(B), as to the information of the object according to the object data 524d, the sampled coordinates and the thickness of the line are described in correspondence with the number of the sample.

The number of the sample is a serial number given according to a sampling order of the coordinate data. The coordinates are coordinates (XY coordinates) indicated by the sampled coordinate data. Here, although detailed explanation is omitted, the resolution of the second LCD 18 and the detection accuracy of the touch panel 22 are set to the same, and the second LCD 18 and the touch panel 22 are the same in a coordinate system. Accordingly, the coordinates according to the coordinate data detected via the touch panel 22 can be used as coordinates on the second LCD 18 as it is.

However, in this embodiment, a lateral direction of the second LCD 18 and the touch panel 22 is an X-axis direction, and a vertical direction thereof is a Y-axis direction. In FIG. 1, the origin O of the coordinate system on the second LCD 18 and on the touch panel 22 is an upper left vertex of the second LCD 18 and the touch panel 22, a plus direction of the X-axis is a right direction in FIG. 1, and a plus direction of the Y-axis is a downward direction in FIG. 1.

Furthermore, the thickness is decided depending on the distance between the coordinates indicated by the currently sampled coordinate data and the coordinates indicated by the coordinate data sampled immediately before as described above. The thickness of the line (the number of dots) corresponding to the distance is fetched from the thickness-of-line table shown in FIG. 8(A). Here, as to the first coordinates (the number of the sample=1), there is no coordinates immediately before, and therefore, the thickness is not determined.

Returning to FIG. 7, the hit judging data 524e is data being made up of a transparent polygon having the same or approximately the same shape (size) as the drawn object 122 is generated. Thus, when the drawn object 122 is moved, the hit judging polygon is also moved according thereto.

The object moving direction data 524f is data as to the vector $V_h$ generated according to the object moving program 522f. The object moving velocity data 524g is data as to the moving velocity A calculated according to the object moving program 522f.

Although illustration is omitted, in the data memory area 524, sound (music) data for generating sound necessary for the game is stored or a counter (timer) and a flag which are necessary for the game processing are provided.

Figure 9:
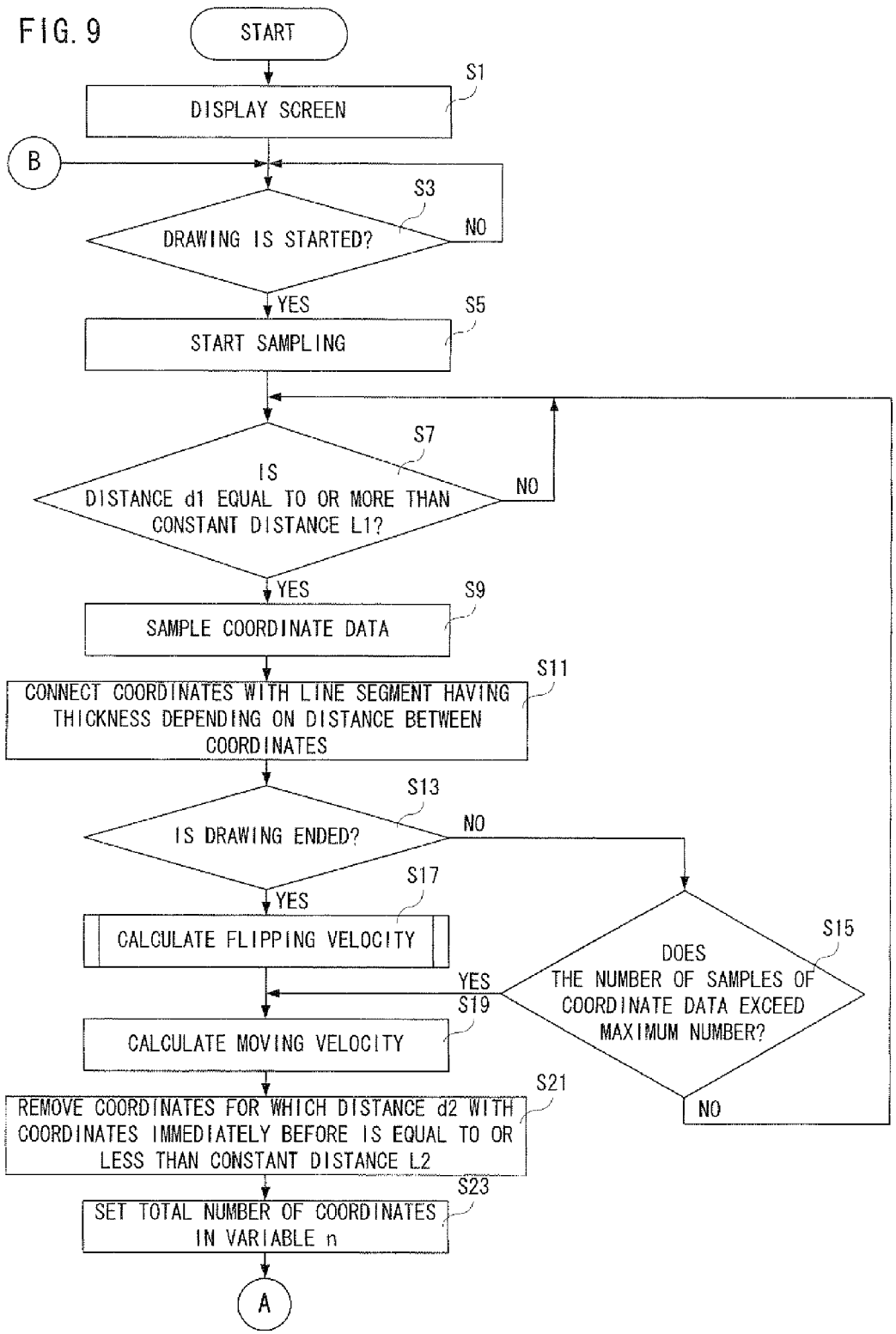
FIG. 9 is a flowchart showing a part of game entire processing of a CPU shown in FIG. 3.
Figure 10:
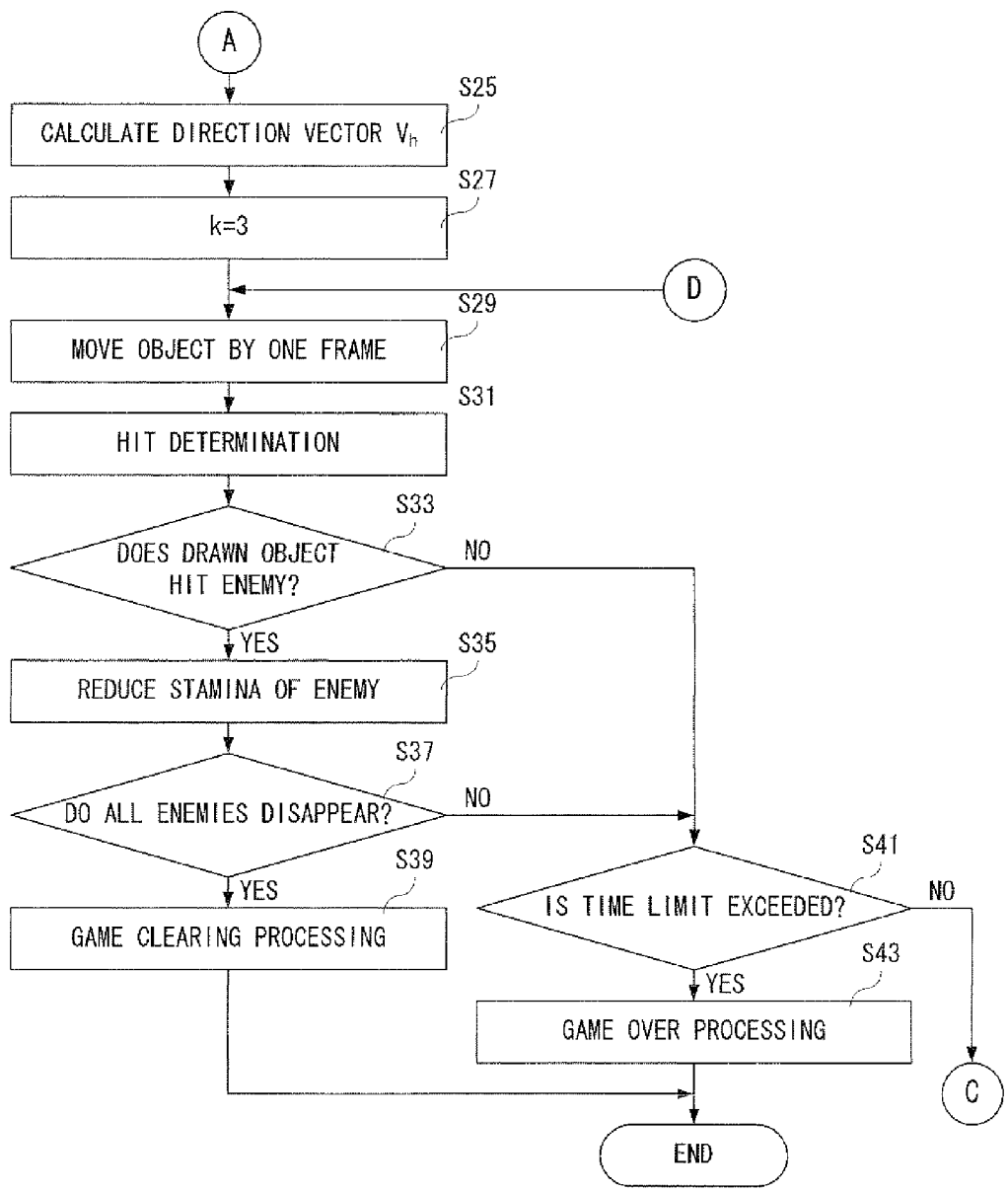
FIG. 10 is another part of the game entire processing by the CPU shown in FIG. 3, and flowchart sequel to FIG. 9.
Figure 11:
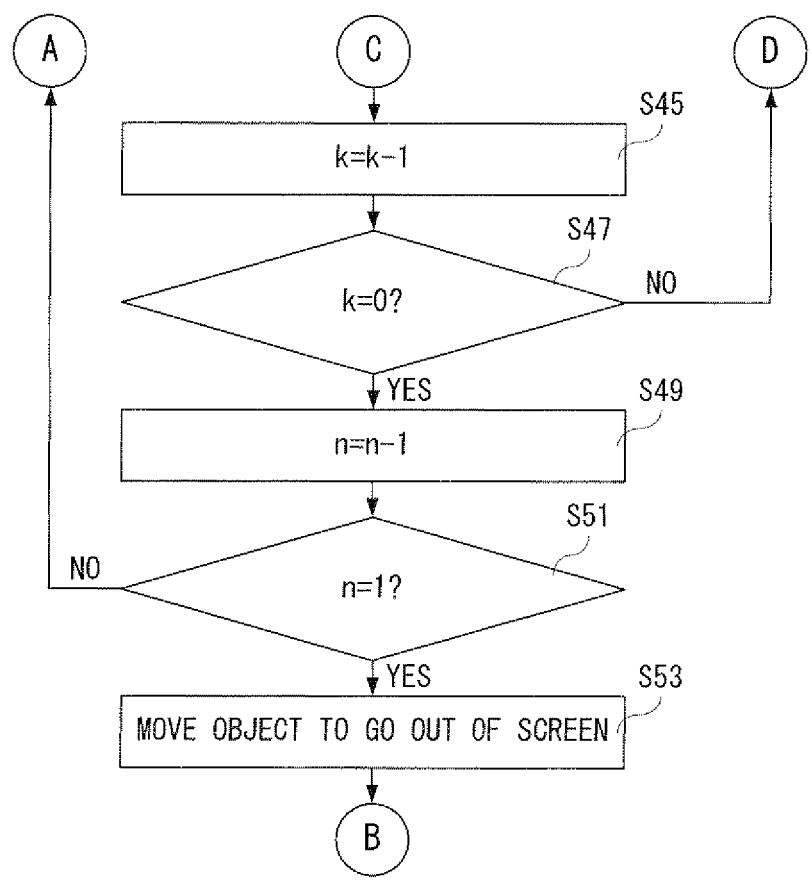
FIG. 11 is a still another part of the game entire processing by the CPU shown in FIG. 3, and flowchart sequel to FIG. 10.

FIG. 9 to FIG. 11 is a flowchart showing game entire processing by the CPU 50 shown in FIG. 3. As shown in FIG. 9, when starting game entire processing, the CPU 50 displays a game screen in a step S1. Although illustration is omitted, the CPU 50 generates and displays a game screen on which the enemy object 112, 114 and the background image are drawn. That is, the game screen on which the drawn object 122 does not exist is displayed. Here, the block object 116 may be sometimes drawn.

Although illustration is omitted, when the game is started, a timer for counting a time limit is started. Here, in a case that the number of attacks is restricted, a counter for counting the number of attacks is reset.

In a next step S3, it is determined whether or not drawing is started. That is, the CPU 50 determines whether or not a touch-off state changes to a touch-on state. More specifically, the CPU 50 determines whether or not coordinate data is input to the input data buffer 524a. If "NO" in the step S3, that is, if drawing is not started, the process returns to the same step S3 as it is. On the other hand, if "YES" in the step S3, that is, if drawing is started, sampling is started in a step S5. Here, the CPU 50 stores the coordinate data firstly input as coordinate data of the drawing start position in the data memory area 524. That is, generating of the object data 524d (information of the object) is started.

In a succeeding step S7, it is determined whether or not a distance d1 is equal to or more than a constant distance L1 (3 dots). Here, the CPU 50 calculates the distance d1 between the coordinates indicated by the coordinate data sampled immediately before and the coordinates indicated by the coordinate data to be currently referred according to Equation 1, and determines whether or not the distance d1 is equal to or more than the constant distance L1.

If "NO" in the step S7, that is, if the distance d1 is not equal to or more than the constant distance L1, the process returns to the step S7 as it is. That is, the coordinate data for which the distance d1 is less than the constant distance L1 is not sampled, whereby the coordinate data due to an unintentional movement is excluded. That is, it is possible to prevent the memory from being filled with unnecessary data. On the other hand, if "YES" in the step S7, that is, if a movement is performed by the constant distance L1 or more, the coordinate data which is currently referred is sampled in a step S9. That is, the CPU 50 adds the coordinate data which is currently being referred to the object data 524d. Then, in a step S11, the two coordinates are connected with a line segment having a thickness depending on the distance d1. Here, the CPU 50 connects the coordinates currently sampled and the coordinate sampled immediately before with the line segment having a thickness (the number of dots) decided in the thickness table depending on the distance d1 between the coordinates.

Succeedingly, in a step S13, it is determined whether or not drawing is ended. The CPU 50, here, determines whether or not a touch-on state changes to a touch-off state. More specifically, the CPU 50 determines whether or not there is no input of the coordinate data to the input data buffer 524a. If "NO" in the step S13, that is, if drawing is not ended, it is determined whether or not the number of samples of the coordinate data exceeds a maximum number (200) in a step S15.

If "YES" in the step S15, that is, if the number of samples of the coordinate data exceeds the maximum number, the process proceeds to a step S19. Although illustration is omitted, if "YES" in the step S15, after the flipping velocity α is set to 0, the process proceeds to the step S19. On the other hand, if "NO" in the step S15, that is, if the number of samples of the coordinate data does not exceed the maximum number, the process returns to the step S7 as it is.

Alternatively, if "YES" in the step S13, that is, if drawing is ended, flipping velocity calculating processing (see FIG. 12) described later is executed in a step S17, and the process proceeds to the step S19. In the step S19, a moving velocity A is calculated according to Equation 3.

Succeedingly, in a step S21, the coordinates for which a distance d2 with the coordinates immediately before is equal to or less than a constant distance L2 (10 dots) are removed. That is, the CPU 50 extracts the coordinates for generating a direction vector $V_h$ from the information of the object indicated by the object data 524d. In a next step S23, a total number of coordinates is set to the variable n. Here, the CPU 50 sets the total number of coordinates which has not been removed by the processing in the step S21.

As shown in FIG. 10, in a next step S25, a direction vector $V_h$ is calculated. As described above, the direction vector $V_h$ is calculated according to Equation 2. In a succeeding step S27, an initial value is set to a variable k (k=3). In this embodiment, the drawn object 122 is moved in the direction indicated by the direction vector $V_h$ by three frames. The variable k is set for counting the number of frames.

In a following step S29, the drawn object 122 is moved by one frame. Here, the drawn object 122 is moved by one frame of the moving distance decided by the moving velocity A calculated in the step S19 toward the direction vector $V_h$ calculated in the step S25. Then, in a step S31, a hit between the enemy object 112, 114 and the drawn object 122 is determined at the position after movement.

Here, the hit determining method is not an essential content of the present invention, and it is already well-known, so that detailed explanation is omitted.

Succeedingly, in a step S33, it is determined whether or not the drawn object 122 hits the enemy. If "NO" in the step S33, that is, if the drawn object 122 does not hit the enemy, the process proceeds to a step S41. On the other hand, if "YES" in the step S33, that is, if the drawn object 122 hits the enemy, the stamina of the enemy object 112, 114 is subtracted by the damage corresponding to the thickness of the leading end portion of the drawn object 122 in a step S35. Although illustration is omitted, if the damage by the drawn object 122 is above the stamina of the enemy object 112, 114 at this time, the enemy object 112, 114 is made to disappear from the game screen 100 (game space).

Although illustration is omitted, as described above, only when the drawn object 122 hits the enemy object 112, 114 from the leading end portion, the enemy object 112, 114 is damaged, so that if the drawn object 122 hits the enemy object 112, 114 from the portion except for the leading end portion, the process proceeds to the step S41 without the enemy object 112, 114 being damaged.

Although illustration is omitted, if the drawn object 122 hits the block object 116 from the leading end portion, the block object 116 may be made to disappear.

Then, in a step S37, it is determined whether or not all the enemies disappear. That is, the CPU 50 determines whether or not all the enemy objects 112, 114 disappear on the game screen 100 (game space). If "NO" in the step S37, that is, if at least one enemy object 112, 114 exists on the game screen 100 (game space), the process proceeds to the step S41. On the other hand, if "YES" in the step S37, that is, if all the enemy objects 112, 114 disappear on the game screen 100 (game space), game clearing processing is executed in a step S39, and the game entire processing is ended. For example, in the step S39, a game screen showing that the game is to be cleared is displayed, a sound effect and music showing that the game is to be cleared are output.

In the step S41, it is determined whether or not a time limit (60 seconds, for example) is exceeded. That is, the CPU 50 determines whether or not the time from the start of the game exceeds the time limit. Here, in a case that the number of attacks is restricted, it is determined whether or not the limited number of attacks here is exceeded. Furthermore, the number of attacks is added by one when the processing in a step S53 is ended and then, the process returns to the step S3 as described later. In addition, limits are installed on both of the time from the start of the game and the number of attacks, and if any one of the limits is exceeded, the game may be over.

If "NO" in the step S41, that is, if the time limit is not exceeded, the process proceeds to a step S45 shown in FIG. 11. On the other hand, if "YES" in the step S41, that is, if the time limit is exceeded, game over processing is executed in a step S43, and the game entire processing is ended. For example, in the step S43, a game screen showing that the game is over is displayed, and a sound effect and music showing that the game is over are output.

As shown in FIG. 11, in the step S45, the variable k is subtracted by one (k=k−1), and in a step S47, it is determined whether or not the variable k is 0 (k=0). That is, the CPU 50 determines whether or not the drawn object 122 is moved to the direction vector $V_h$ by three frames.

If "NO" in the step S47, that is, if the variable k is not 0, the process returns to the step S29 shown in FIG. 10. On the other hand, if "YES" in the step S47, that is, if the variable k is 0, the variable n is subtracted by one (n=n−1) in a step S49, and it is determined whether or not the variable n is 1 (n=1) in a step S51. That is, the CPU 50 determines whether or not the movement of the drawn object 122 according to the direction vector $V_h$ is ended. If "NO" in the step S51, that is, if the variable n is not 1, the process returns to the step S25 to calculate a next direction vector $V_h$. On the other hand, if "YES" in the step S51, that is, if the variable n is 1, the drawn object 122 is moved to go out of the game screen 100 in a step S53. Here, in the step S53, the drawn object 122 is moved toward the direction vector $V_h$ calculated last at the moving velocity A.

Although illustration is omitted, in a case that the drawn object 122 is moved in the step S29, if the entire drawn object 122 is out of the game screen 100, even if the drawn object 122 has not yet been moved according to all direction vectors $V_h$, the drawn object 122 is made to disappear, and the process returns to the step S3.

Figure 12:
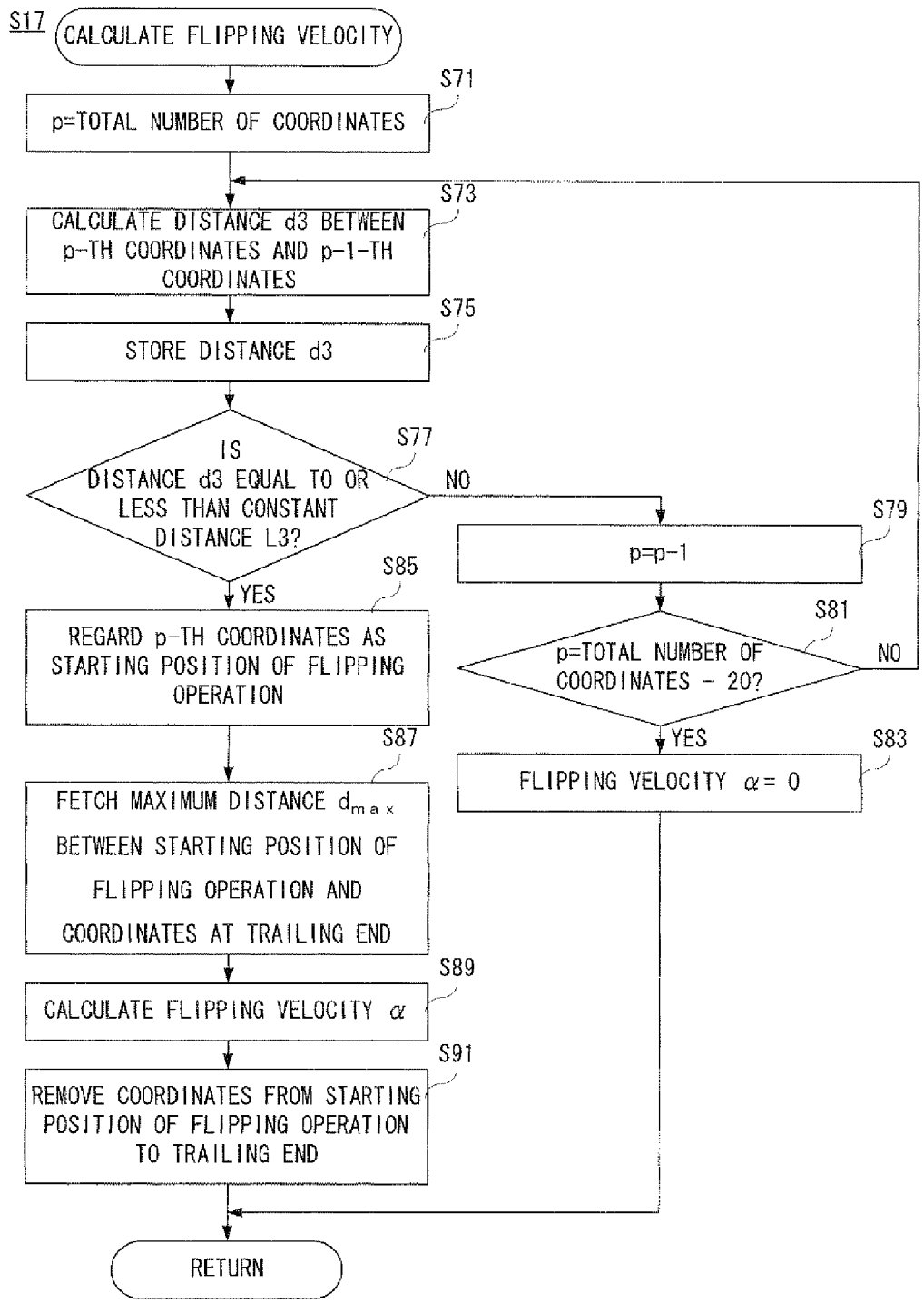
FIG. 12 is a flowchart showing flipping velocity calculating processing by the CPU shown in FIG. 3.

FIG. 12 is a flowchart showing flipping velocity calculating processing in the step S17 shown in FIG. 9. As shown in FIG. 12, when starting the flipping velocity calculating processing, the CPU 50 sets the total number of coordinates to a variable p in a step S71. The CPU 50, here, sets the total number of coordinates m included in the object data 524d to the variable p. In a next step S73, the distance d3 between the p-th coordinates and the p−1-th coordinates is calculated, and in a step S75, the distance d3 calculated in the step S73 is stored (temporarily stored) in the working area (not illustrated) of the main memory 52.

Succeedingly, in a step S77, it is determined whether or not a distance d3 is equal to or less than a constant distance L3 (3 dots in this embodiment). If "NO" in the step S77, that is, if the distance d3 exceeds the constant distance L3, the variable p is subtracted by one (p=p−1) in a step S79, and it is determined whether or not the variable p is the total number of coordinates −20 in a step S81. That is, out of all the sampled coordinates, as to the 20 samples of coordinates from the coordinates at the trailing end, it is determined that determination processing of the presence or absence of a flipping operation is ended.

If "NO" in the step S81, that is, if the variable p is not the total number of coordinates −20, the process returns to the step S73 as it is. On the other hand, if "YES" in the step S81, that is, if the variable p is the total number of coordinates −20, it is determined that there is no flipping operation, and 0 is set to the flipping velocity a in a step S83, and the process returns to the game entire processing.

Furthermore, if "YES" in the step S77, that is, if the distance d3 is equal to or less than the constant distance L3, the p-th coordinates is regarded as a starting position of a flipping operation in a step S85. In a succeeding step S87, a maximum distance $d_{max}$ is fetched between the starting position of the flipping operation and the coordinates at the trailing end. That is, the CPU 50 fetches the maximum value out of the plurality of distances d3 stored in the working area of the main memory 52.

In a next step S89, a flipping velocity α is calculated by using the maximum distance $d_{max}$ according to Equation 4. Then, in a step S91, the coordinates from the starting position of the flipping operation to the trailing end are deleted from the object data 524d, and the process returns to the game entire processing.

According to this embodiment, the drawn object is generated according to a touch operation by the player, and the generated drawn object is moved according to a course decided based on a locus of the touch operation, thus it is possible to generate a complex object with a simple operation, and move the object according to a complex route. Accordingly, it is necessary to generate the drawn object with a strategy devised, capable of increasing interest in the game.

The game apparatus 10 of another embodiment is the same as the above-described embodiment except that if the coordinates of the touched position do not change for a certain period of time or more during drawing (generating) of the drawn object 122, a copy of the drawn object 122 which has been generated until now is moved according to the moving course based on the locus, and therefore, a duplicated description is omitted.

Although illustration is omitted, the copy of the drawn object 122 is an object (copy object) which translucently represents the drawn object 122, for example. The copy object is for instructing the player how the drawn object 122 moves at this time point, that is, the moving course of the drawn object 122. Thus, a hit determination with the enemy object 112, 114 and the block object 116 is not required about the copy object, and therefore, the hit judging polygon is not set.

Furthermore, in a case that the coordinates of the touched position do not change for a certain period of time or more, the copy object starts to move, so that there is no increase in velocity by the flipping operation.

Figure 13:
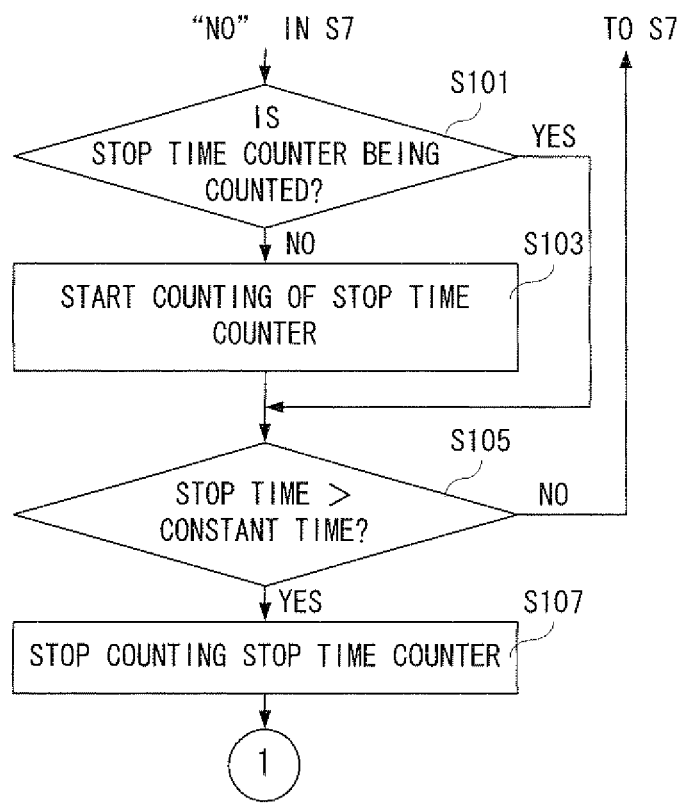
FIG. 13 is a flowchart showing a part of the game entire processing by the CPU of another embodiment.
Figure 14:
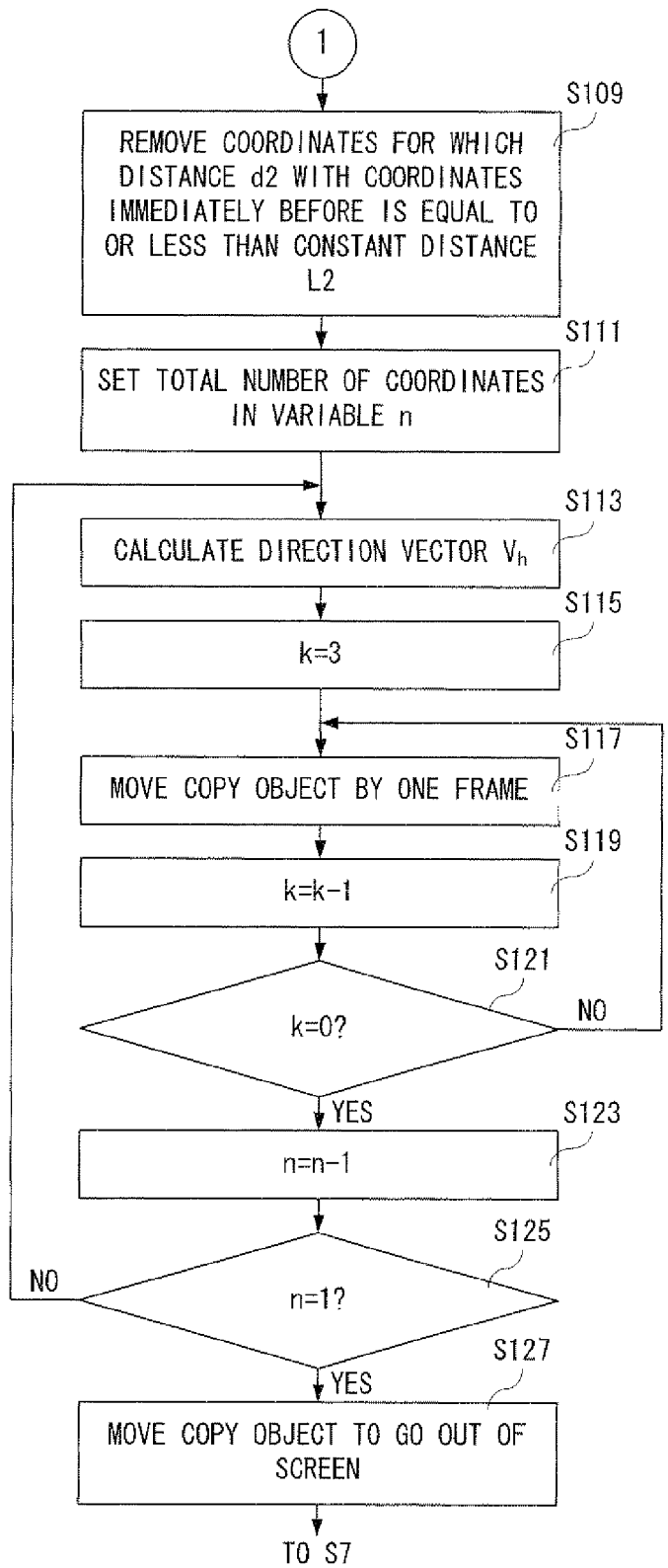
FIG. 14 is a flowchart showing another part of the game entire processing by the CPU of this another embodiment.

More specifically, movement processing of the copy object shown in FIG. 13 and FIG. 14 is added to the game entire processing shown in FIG. 9-FIG. 11. Here, the movement processing of the copy object is approximately the same as the movement processing of the drawn object 122, and therefore, the same processing is simply explained.

As shown in FIG. 13, if "NO" in the step S7, that is, if a movement is not performed by a constant distance L1 or more, it is determined whether or not a stop time counter is being counted in a step S101. The stop time counter is a counter (timer) for counting a time during which a touched position is stopped, and is set to the data memory area 524 of the main memory 52 although illustration is omitted. If "YES" in the step S101, that is, if the stop time counter is being counted, the process proceeds to a step S105 as it is. On the other hand, if "NO" in the step S101, that is, if the stop time counter is not being counted, counting of the stop time counter is started in a step S103, and the process proceeds to the step S105. Here, in the step S103, the stop time counter is reset and started.

In the step S105, it is determined whether or not the stop time is above a certain period of time (three seconds, for example). That is, the CPU 50 determines whether or not the count value of the stop time counter is above the certain period of time. If "NO" in the step S105, that is, if the stop time is equal to or less than the certain period of time, the process returns to the step S7 as it is. On the other hand, if "YES" in the step S105, that is, if the stop time is above the certain period of time, the stop time counter is instructed to stop counting in a step S107, and the process proceeds to a step S109 shown in FIG. 14.

Although illustration is omitted, if "YES" in the step S7 as well, the counting of the stop time counter is stopped.

As shown in FIG. 14, in the step S109, the coordinates for which a distance with the coordinate immediately before is equal to or less than a constant distance L2 is removed. In a next step S111, a total number of coordinates is set to a variable n. Succeedingly, in a step S113, a direction vector $V_h$ is calculated. Then, in a step S115, an initial value (3) is set to a variable k.

In a next step S117, the copy object is moved by one frame. Here, the moving velocity A is a reference velocity $A_0$ set in advance. In a next step S119, the variable k is subtracted by one. Then, it is determined whether or not the variable k is 0 in a step S121. If "NO" in the step S121, the process returns to the step S117 as it is. On the other hand, if "YES" in the step S121, the variable n is subtracted by one in a step S123.

Then, in a step S125, it is determined whether or not the variable n is 1. If "NO" in the step S125, the process returns to the step S113. On the other hand, if "YES" in the step S125, the copy object is moved until it is out of the screen in a step S127, and the process returns to the step S7.

According to this another embodiment, the copy object is moved under a predetermined condition to thereby preliminarily know the moving course of the drawn object, and therefore, it is possible to attack the enemy object with the strategy devised, such as making a touch-off operation as it is, continuing to draw the drawing object, executing a flipping operation, etc. Thus, it is possible to moreover increase interest in the game.

Additionally, in the above-described embodiment, in a case that a flipping operation is performed, the velocity of the drawn object is made high in response thereto, but the velocity may be made low.

Moreover, in the above-described embodiment, in a case that a flipping operation is made, the velocity to be added is calculated on the basis of the maximum distance in the flipping operation, but this is not limited thereto. For example, in a case that any one of the operating switches 20 is pushed, or a predetermined event occurs in the virtual game, the moving velocity of the drawn object may be made high. In addition, the velocity to be added may be decided to a constant value.

Additionally, in the above-described embodiment, as one example of the object controlling apparatus, a hand-held type game apparatus is only explained, but this is not restricted thereto. The present application can be applied to other type of the object controlling apparatuses, such as a console type game apparatus a personal computer, a PDA, a cellular phone having a game function, etc. having a pointing device, such as a touch panel, a computer mouse or a pen tablet, or being connected with such a pointing device. However, in a case that the pointing device except for the touch panel is provided, a designated position by the pointing device is required to be shown, and therefore, a designation image like a mouse pointer is displayed on the game screen.

In addition, the configuration of the game apparatus is not required to be restricted to this embodiment. For example, one camera may be provided, and no camera may be provided. Furthermore, the touch panel may be provided on the two LCDs.

Although the embodiments have been described and illustrated in detail, it is clearly understood that the same is by way of illustration and example only and is not to be taken by way of limitation, the spirit and scope of the present invention being limited only by the terms of the appended claims.

What is claimed is:

1. A non-transitory computer readable storage medium storing an object controlling program, said object controlling program comprising instructions that cause a computing system to at least:
   detect an operation input performed by a player;
   generate a first object according to the detected operation input; and
   move the generated first object according to a moving course based on a locus indicated by the detected operation input,
   wherein said moving course is a course where the locus indicated by the detected operation input is at a time that the first object is generated, the moving course including two or more direction vectors that are sequentially calculated toward coordinates of a start position of the operation input from coordinates of an end position of the operation input, and the first object is moved in accordance with a calculated sequence in a direction indicated by each of the two or more direction vectors for a time period at a moving velocity.

2. The medium of claim 1, wherein the instructions further cause the computing system to:
   decide a moving direction when said first object moves based on the locus, and
   the moving course is further based on the decided moving direction.

3. The medium of claim 1, wherein
   the operation input by the player is coordinate data designating coordinates on a display surface of a displayer, and
   the first object is generated by connecting coordinates indicated by a plurality of coordinate data in chronological order with a line segment.

4. The medium of claim 3, wherein
   a thickness of each one of the plurality of the line segments is set depending on a distance between temporally continuous coordinates.

5. The medium of claim 3, wherein the instructions further cause the computing system to:
   move a copy of the generated first object at this time according to a moving course based on the operation inputs which have been detected up to this time when a situation in which the distance between the temporally continuous coordinates is less than a constant distance continues.

6. The medium of claim 1, wherein the instructions further cause the computing system to:
   change a moving velocity of said first object when a predetermined condition is satisfied.

7. The medium of claim 6, wherein
   the operation input by the player is coordinate data indicating coordinates on a display surface of a displayer, and
   wherein the instructions further cause the computing system to: determine whether or not said predetermined condition is satisfied on the basis of a change of the coordinates indicated by a plurality of coordinate data.

8. The medium of claim 1, wherein
   a second object different from the first object exists in a virtual space, and
   wherein the instructions further cause the computing system to: give an impact to at least a second object when the first object hits said second object.

9. An object controlling apparatus, comprising:
   a user input that is configured to detect an operation input performed by a player; and
   a processing system including at least one processor, the processing system configured to:
      generate an object according to the operation input performed by the player; and
      move the generated object according to a moving course based on a locus indicated by the operation input performed by a player,
   wherein said moving course is a course where the locus indicated by the detected operation input is at a time that the object is generated, the moving course including two or more direction vectors that are sequentially calculated toward coordinates of a start position of the operation input from coordinates of an end position of the operation input, and the object is moved in accordance with a calculated sequence in a direction indicated by each of the two or more direction vectors for a time period at a moving velocity.

10. A method of controlling a virtual object that is processed by a computing system that includes at least one processor, the method comprising:
   detecting an operation input performed by a player;
   generating an object according to the detected operation inputs; and
   moving, via the at least one processor, the generated object according to a moving course that is based on a locus indicated by the detected operation inputs,
   wherein said moving course is a course where the locus indicated by the detected operation input is at a time that the object is generated, the moving course including two or more direction vectors that are sequentially calculated toward coordinates of a start position of the operation input from coordinates of an end position of the operation input, and the object is moved in accordance with a calculated sequence in a direction indicated by each of the two or more direction vectors for a time period at a moving velocity.

11. A non-transitory computer readable storage medium storing an object controlling program, said object controlling program comprising instructions that cause a computing system to at least:

detect an operation input performed by a player, wherein the operation input is associated with a plurality of coordinate positions;
generate a first object according to the detected operation input;
move the generated first object according to a moving course based on a locus indicated by the detected operation input;
determine a plurality of movement vectors for moving the generated first object in accordance with the plurality of coordinate positions; and
generate the moving course based on the plurality of movement vectors,
wherein:
the determined plurality of movement vectors includes a first movement vector,
the plurality of coordinate positions includes a first coordinate position and a second coordinate position, and
the first movement vector determined based on the second coordinate position to the first coordinate position, where the first coordinate position is associated with an earlier operation input than the second coordinate position.

12. The medium of claim 1, wherein the detected operation input includes a plurality of coordinate positions and the computing system is further configured to:
determine the moving course based on a reverse input order of the plurality of coordinate positions.

* * * * *